United States Patent
Matsumoto et al.

(10) Patent No.: US 9,778,812 B2
(45) Date of Patent: Oct. 3, 2017

(54) SCREEN TRANSITION DIAGRAM CREATOR

(71) Applicants: Kunio Matsumoto, Tokyo (JP); Koichi Nakagawa, Tokyo (JP)

(72) Inventors: Kunio Matsumoto, Tokyo (JP); Koichi Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 269 days.

(21) Appl. No.: 14/428,429

(22) PCT Filed: Oct. 12, 2012

(86) PCT No.: PCT/JP2012/076443
§ 371 (c)(1),
(2) Date: Mar. 16, 2015

(87) PCT Pub. No.: WO2014/057574
PCT Pub. Date: Apr. 17, 2014

(65) Prior Publication Data
US 2015/0248190 A1    Sep. 3, 2015

(51) Int. Cl.
*G06F 3/0481* (2013.01)
*G06F 9/44* (2006.01)
*G06F 17/21* (2006.01)

(52) U.S. Cl.
CPC ........ *G06F 3/0481* (2013.01); *G06F 3/04817* (2013.01); *G06F 8/38* (2013.01); *G06F 17/212* (2013.01)

(58) Field of Classification Search
CPC ................................................ G06F 3/04817
(Continued)

(56) References Cited

U.S. PATENT DOCUMENTS 5,515,487 A * 5/1996 Beaudet ................ G06T 11/206
345/440
5,606,654 A * 2/1997 Schuur ..................... G09G 5/00
345/440
(Continued)

FOREIGN PATENT DOCUMENTS

CN          1152748 A       6/1997
JP          01-133176       5/1989
(Continued)

OTHER PUBLICATIONS

International Search Report dated Nov. 13, 2012 in PCT/JP2012/076443 filed Oct. 12, 2012.
(Continued)

*Primary Examiner* — Reza Nabi
*Assistant Examiner* — Daniel Rodriguez
(74) *Attorney, Agent, or Firm* — Oblon, McClelland, Maier & Neustadt, L.L.P.

(57) ABSTRACT

A screen transition diagram creator that creates a screen transition diagram illustrating complicated transition relations in an easy-to-understand manner, including: a screen transition diagram editor providing the screen transition diagram in which transition relations among plural screens are illustrated by plural screen nodes and arrows between the screen nodes; a screen transition pattern applying unit applying a predetermined screen transition pattern to a target screen node group that includes at least part of the screen nodes illustrated in the screen transition diagram to provide a pattern-applied screen node group; and a screen transition structure diagram creator creating a screen transition structure diagram by abridgement processing on the pattern-applied screen node group according to a display layout corresponding to the screen transition pattern. In the abridgement processing, arrows are deleted and an icon that
(Continued)

simplistically illustrates a transition pattern between the screen nodes displayed in the display layout is added.

5 Claims, 27 Drawing Sheets

(58) Field of Classification Search
USPC .......................................................... 715/746
See application file for complete search history.

(56) References Cited

U.S. PATENT DOCUMENTS

| | | | | |
|---|---|---|---|---|
| 5,911,145 | A * | 6/1999 | Arora | G06F 17/21 |
| | | | | 707/E17.013 |
| 6,108,698 | A * | 8/2000 | Tenev | G06F 17/30958 |
| | | | | 707/E17.011 |
| 6,675,207 | B1 * | 1/2004 | Mamada | G06F 9/45512 |
| | | | | 706/48 |
| 7,661,076 | B2 * | 2/2010 | Seemann | G06Q 30/00 |
| | | | | 715/765 |
| 7,720,857 | B2 * | 5/2010 | Beringer | G06F 17/30991 |
| | | | | 345/676 |
| 8,224,862 | B2 * | 7/2012 | Sacks | G06Q 10/10 |
| | | | | 707/797 |
| 2003/0011637 | A1 * | 1/2003 | Boudier | G06T 17/005 |
| | | | | 715/771 |
| 2003/0184599 | A1 * | 10/2003 | Beaudoin | H04Q 3/0062 |
| | | | | 715/853 |
| 2004/0090472 | A1 * | 5/2004 | Risch | G06F 17/30716 |
| | | | | 715/853 |
| 2004/0104946 | A1 * | 6/2004 | Li | G06F 9/4443 |
| | | | | 715/853 |
| 2007/0006179 | A1 * | 1/2007 | Tjong | G06F 8/51 |
| | | | | 717/136 |
| 2008/0133563 | A1 | 6/2008 | Hironiwa | |
| 2011/0148880 | A1 * | 6/2011 | De Peuter | G06T 11/206 |
| | | | | 345/440 |
| 2011/0249002 | A1 * | 10/2011 | Duplessis | G06T 11/206 |
| | | | | 345/440 |
| 2012/0147405 | A1 * | 6/2012 | Suzuki | G03G 15/502 |
| | | | | 358/1.13 |
| 2013/0104088 | A1 * | 4/2013 | Santos-Gomez | G06F 17/30994 |
| | | | | 715/854 |
| 2013/0174064 | A1 * | 7/2013 | Shikasho | G06F 3/048 |
| | | | | 715/762 |
| 2013/0335339 | A1 * | 12/2013 | Maunder | G06F 3/0488 |
| | | | | 345/173 |
| 2014/0095972 | A1 * | 4/2014 | Molesky | G06F 17/211 |
| | | | | 715/227 |

FOREIGN PATENT DOCUMENTS

| | | |
|---|---|---|
| JP | 2002-182914 A | 6/2002 |
| JP | 2007-004466 A | 1/2007 |
| JP | 2007-079955 A | 3/2007 |
| JP | 2008-242964 A | 10/2008 |
| JP | 2009-086851 A | 4/2009 |

OTHER PUBLICATIONS

International Preliminary Report on Patentability and Written Opinion dated Apr. 23, 2015 in PCT/JP2012/076443 ( with English language translation).

Combined Office Action and Search Report dated Feb. 3, 2017 in Chinese Patent Application No. 201280076355.8 (with English translation of Search Report).

* cited by examiner

| SCREEN NUMBER | 1 | 2 | 3 | 4 | 5 |
|---|---|---|---|---|---|
| X COORDINATE | 200 | 168 | 248 | 248 | 320 |
| Y COORDINATE | 40 | 112 | 112 | 184 | 184 |
| WIDTH | 48 | 48 | 48 | 48 | 48 |
| HEIGHT | 36 | 36 | 36 | 36 | 36 |
| LIST OF TRANSITION DESTINATION SCREENS | 2, 3 | 1 | 4, 5 | | |

FIG. 4

| | PATTERN ID | 1 | 2 | 3 | 4 |
|---|---|---|---|---|---|
| TRANSITION FROM REPRESENTATIVE SCREEN | TRANSITION TO TOP SCREEN | ○ | ○ | | |
| | TRANSITION TO LAST SCREEN | | ○ | | |
| | TRANSITIONS TO ALL SCREENS | | | ○ | ○ |
| TRANSITION TO REPRESENTATIVE SCREEN | TRANSITION FROM TOP SCREEN | ○ | ○ | | |
| | TRANSITION FROM LAST SCREEN | | ○ | | |
| | TRANSITIONS FROM ALL SCREENS | | | ○ | ○ |
| TRANSITIONS BETWEEN SCREENS OTHER THAN REPRESENTATIVE SCREEN | TRANSITIONS IN ASCENDING ORDER | ○ | ○ | | |
| | TRANSITIONS IN DESCENDING ORDER | ○ | ○ | | |
| | LOOP BETWEEN TOP SCREEN AND LAST SCREEN | | | | |
| | TRANSITIONS BETWEEN ALL SCREENS | | | | ○ |

F I G. 6

| PATTERN ID | | 1 | 2 | 3 | 4 |
|---|---|---|---|---|---|
| SIZE OF REPRESENTATIVE SCREEN | WIDTH | 48 | 48 | 48 | 48 |
| | HEIGHT | 24 | 24 | 24 | 24 |
| POSITION OF REPRESENTATIVE SCREEN | X COORDINATE | 10 | 10 | 0 | 35 |
| | Y COORDINATE | 5 | 5 | 6 | 5 |
| SCREENS OTHER THAN REPRESENTATIVE SCREEN | PRESENCE OR ABSENCE | ○ | ○ | ○ | ○ |
| SIZE OF SCREENS OTHER THAN REPRESENTATIVE SCREEN | WIDTH | 48 | 48 | 15 | 48 |
| | HEIGHT | 24 | 24 | 12 | 24 |
| POSITION OF TOP SCREEN OTHER THAN REPRESENTATIVE SCREEN | X COORDINATE | 48 | 48 | 0 | 5 |
| | Y COORDINATE | 39 | 39 | 24 | 39 |
| OFFSET OF SCREENS SUBSEQUENT TO TOP SCREEN | OFFSET IN X DIRECTION | 0 | 0 | 18 | 53 |
| | OFFSET IN Y DIRECTION | 29 | 29 | 15 | 29 |
| | RETURN SCREEN NUMBER | 1 | 1 | 3 | 2 |
| ICON SIZE | WIDTH | 12 | 12 | 12 | 12 |
| | HEIGHT | 12 | 12 | 12 | 12 |
| ICON POSITION | X COORDINATE | 58 | 58 | 42 | 101 |
| | Y COORDINATE | 0 | 0 | 0 | 0 |
| FIELD ENCLOSURE | PRESENCE OR ABSENCE | ○ | ○ | × | ○ |
| REFERENCE SIZE OF FIELD | WIDTH | 68 | 68 | 0 | 111 |
| | HEIGHT | 39 | 39 | 0 | 39 |
| PARTITION LINE | PRESENCE OR ABSENCE | ○ | ○ | × | ○ |
| STARTING-POINT POSITION OF PARTITION LINE | X COORDINATE | 0 | 0 | 0 | 0 |
| | Y COORDINATE | 34 | 34 | 0 | 34 |
| ENDPOINT POSITION OF PARTITION LINE | X COORDINATE | 68 | 68 | 0 | 111 |
| | Y COORDINATE | 34 | 34 | 0 | 34 |

| PATTERN ID | ICON |
|---|---|
| 1 | ↕ |
| 2 | ↻ |
| 3 | ✈ |
| 4 | ✥ |

F I G. 1 2

| SCREEN TRANSITION ABRIDGEMENT NUMBER | 1 | 2 |
|---|---|---|
| PATTERN ID | 1 | 3 |
| PRESENCE OR ABSENCE OF ABRIDGEMENT | ○ | × |
| X COORDINATE | 150 | 300 |
| Y COORDINATE | 150 | 150 |
| REPRESENTATIVE SCREEN NUMBER | 2 | 6 |
| LIST OF NUMBERS OF SCREENS OTHER THAN REPRESENTATIVE SCREEN | 3, 4, 5 | 7, 8 |

FIG. 13
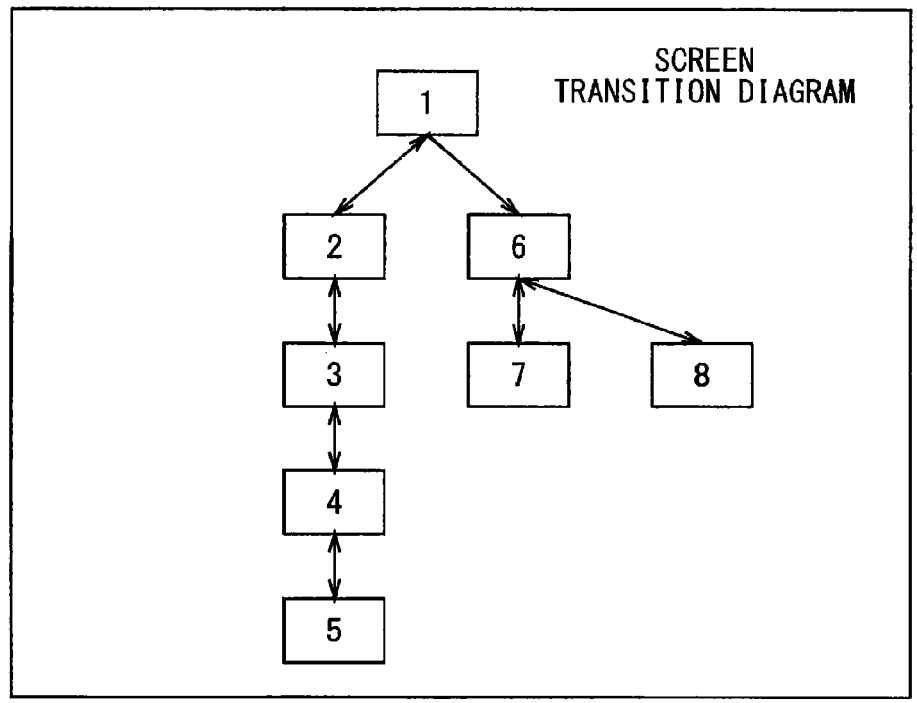
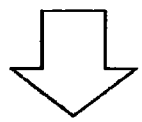
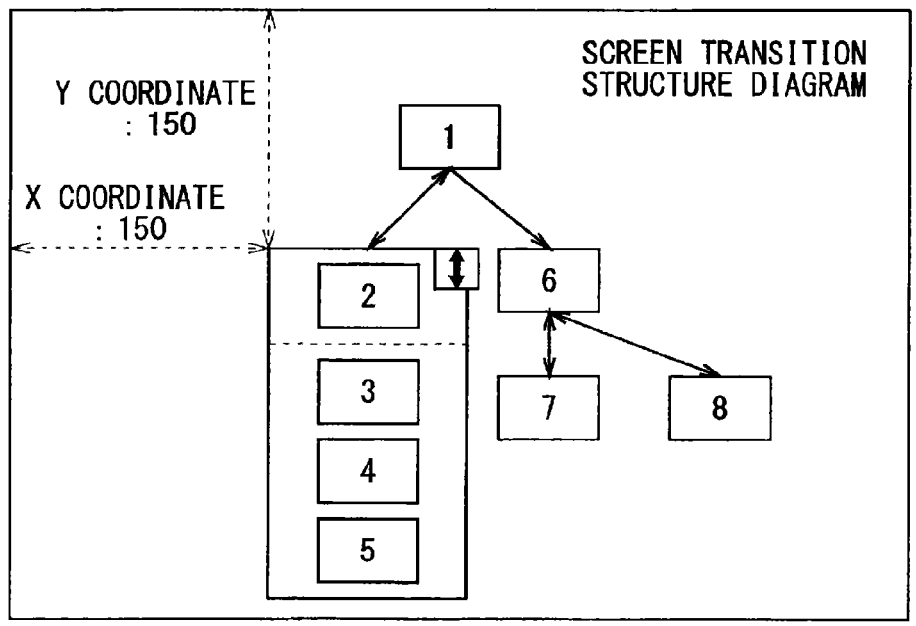

FIG. 15

| PATTERN ID | | 1 | 1 | 1 |
|---|---|---|---|---|
| ABRIDGED NODE NUMBER | | 1 | 2 | 3 |
| SIZE OF REPRESENTATIVE SCREEN | WIDTH | 48 | 48 | 48 |
| | HEIGHT | 24 | 24 | 24 |
| POSITION OF REPRESENTATIVE SCREEN | X COORDINATE | 0 | 0 | 10 |
| | Y COORDINATE | 6 | 6 | 5 |
| SCREENS OTHER THAN REPRESENTATIVE SCREEN | PRESENCE OR ABSENCE | × | ○ | ○ |
| SIZE OF SCREENS OTHER THAN REPRESENTATIVE SCREEN | WIDTH | 0 | 15 | 48 |
| | HEIGHT | 0 | 12 | 24 |
| POSITION OF TOP SCREEN OTHER THAN REPRESENTATIVE SCREEN | X COORDINATE | 0 | 0 | 48 |
| | Y COORDINATE | 0 | 24 | 39 |
| OFFSET OF SCREENS SUBSEQUENT TO TOP SCREEN | OFFSET IN X DIRECTION | 0 | 18 | 0 |
| | OFFSET IN Y DIRECTION | 0 | 15 | 29 |
| | RETURN SCREEN NUMBER | 0 | 3 | 1 |
| ICON SIZE | WIDTH | 12 | 12 | 12 |
| | HEIGHT | 12 | 12 | 12 |
| ICON POSITION | X COORDINATE | 42 | 42 | 58 |
| | Y COORDINATE | 0 | 0 | 0 |
| FIELD ENCLOSURE | PRESENCE OR ABSENCE | × | × | ○ |
| REFERENCE SIZE OF FIELD | WIDTH | 0 | 0 | 68 |
| | HEIGHT | 0 | 0 | 39 |
| PARTITION LINE | PRESENCE OR ABSENCE | × | × | ○ |
| STARTING-POINT POSITION OF PARTITION LINE | X COORDINATE | 0 | 0 | 0 |
| | Y COORDINATE | 0 | 0 | 34 |
| ENDPOINT POSITION OF PARTITION LINE | X COORDINATE | 0 | 0 | 68 |
| | Y COORDINATE | 0 | 0 | 34 |

FIG. 16

| ABRIDGED NODE NUMBER | INEXECUTION OF ABRIDGEMENT | 1 | 2 | 3 |
|---|---|---|---|---|
| ABRIDGED NODE OR SCREEN NODES IN ORIGINAL STATE | 1 ↔ 2 ↔ 3 ↔ 4 | A<br>1 | A—4<br>\|<br>3<br>\|<br>2 | A<br>1 \| 2 \| 3 \| 4 |

F I G. 1 9

| PATTERN ID | | 1 | 2 | 3 | 4 |
|---|---|---|---|---|---|
| ABRIDGED NODE NUMBER | CONDITION 1 | 1 | 1 | 1 | 1 |
| | CONDITION 2 | 2 | 1 | 1 | 2 |
| | CONDITION 3 | 3 | 2 | 0 | 0 |

F I G. 2 6
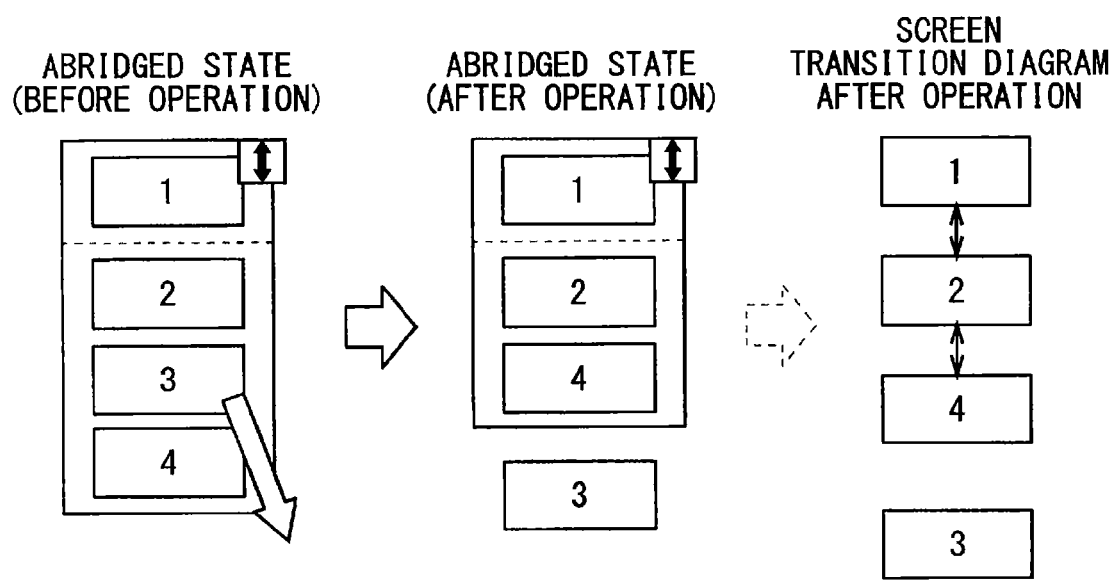

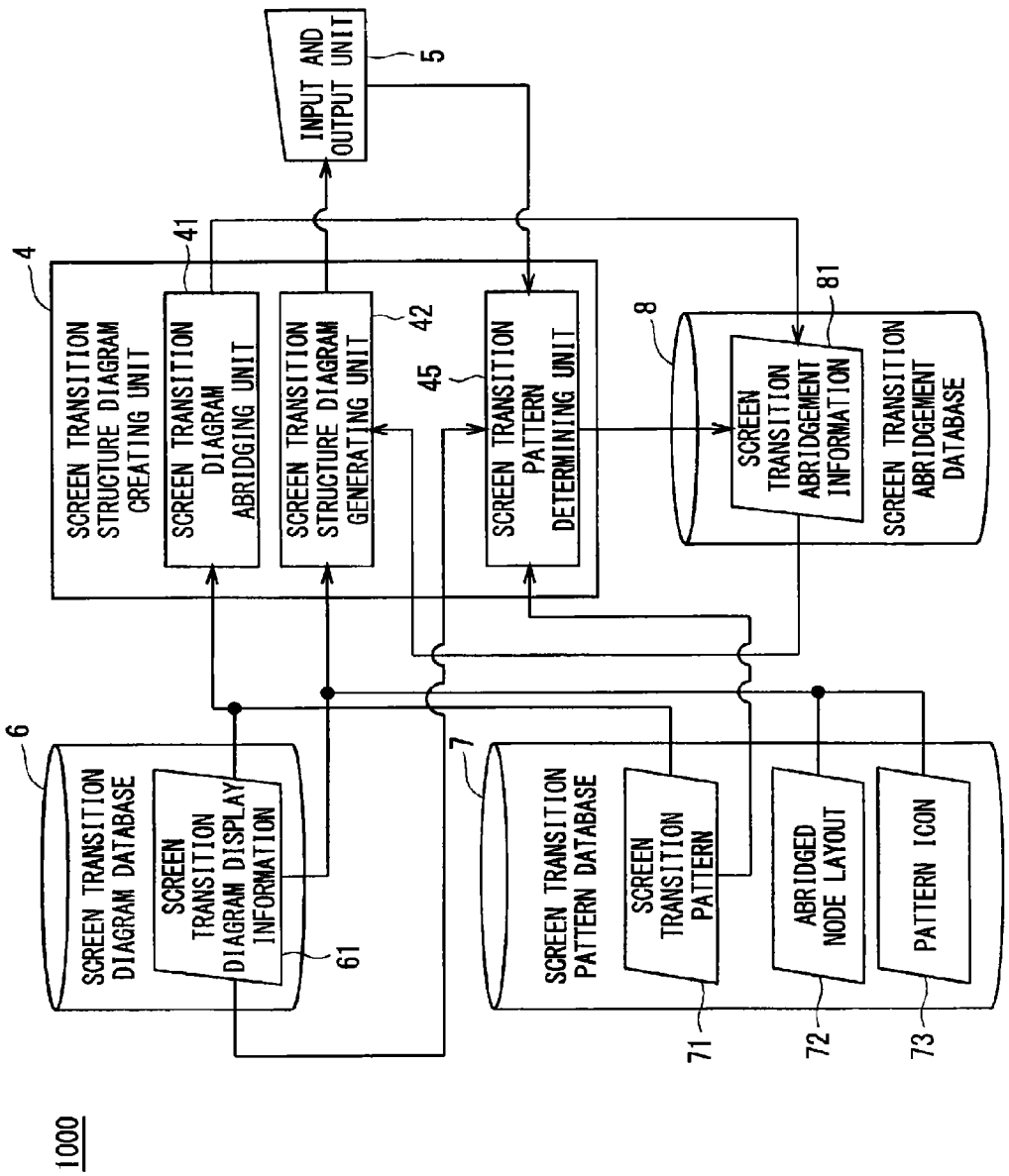

SCREEN TRANSITION DIAGRAM CREATOR

TECHNICAL FIELD

The present invention relates to a screen transition diagram creator that edits a screen transition diagram with a screen transition pattern in which transitions between a plurality of screens are defined.

BACKGROUND ART

Screen transition diagram creators are conventionally known to define screen transitions in man-machine devices for supervisory control and in programmable displays. The conventional screen transition diagram creator includes a screen transition pattern storage that stores the typical transition relations between screens as the screen transition patterns. The transition relations between screens in the screen transition diagram are converted into the transition relation data of the screen transition patterns, thereby enhancing work efficiencies of the creation of screen transition diagrams (see, for example, Patent Document 1).

Another screen transition diagram creator includes an SQL extracting means that loads a source code of an application including the screen transition and extracts SQL statements for causing each screen to invoke a database from the source code. With the SQL statements of a plurality of screens to which the screen concerned makes transitions, the degree of functional similarity to the screen specified by the user in the screen transition diagram is converted into numbers according to the operation performed on the database and the change in the target table, and then, each screen is displayed to overlap the screen designated by the user according to the degree of similarity. Thus, the entire screen transition diagram for the application including a number of screens can be easily viewed from above, thereby enhancing work efficiencies of the creation of screen transition diagrams (see, for example, Patent Document 2).

PRIOR ART DOCUMENTS

Patent Documents

Patent Document 1: Japanese Patent Application Laid-Open No. 2008-242964
Patent Document 2: Japanese Patent Application Laid-Open No. 2009-86851

SUMMARY OF INVENTION

Problem to be Solved by the Invention

The screen transition diagram is difficult to create because of its complication in the development of the application including a number of screens. Although the screen transition diagram creator according to Patent Document 2 provides the overhead view of the entire screen transition diagram by displaying the screens having similar functions to overlap one another, unfortunately, the screen transition between the overlapping screens has been ungraspable, and thus, the screen transition structure has been difficult to understand.

The present invention therefore has been made in view of the above-mentioned problem, and an object thereof is to provide a screen transition diagram creator that creates a screen transition diagram in which complicated transition relations are illustrated in an easy-to-understand manner.

Means to Solve the Problem

A screen transition diagram creator according to the present invention includes: a screen transition diagram providing unit that provides a screen transition diagram in which transition relations among a plurality of screens are illustrated by a plurality of screen nodes and arrows between the screen nodes; a screen transition pattern applying unit that applies a predetermined screen transition pattern to a target screen node group that comprises at least part of the screen nodes illustrated in the screen transition diagram to provide a pattern-applied screen node group; and a screen transition structure diagram creating unit that creates a screen transition structure diagram by performing an abridgement processing on the pattern-applied screen node group in the screen transition diagram according to a display layout corresponding to the screen transition pattern. In the abridgement processing, the arrows are deleted and an icon that simplistically illustrates a transition pattern between the screen nodes displayed in the display layout is added.

Effects of the Invention

The screen transition diagram creator according to the present invention includes: a screen transition diagram providing unit that provides a screen transition diagram in which transition relations among a plurality of screens are illustrated by a plurality of screen nodes and arrows between the screen nodes; a screen transition pattern applying unit that applies a predetermined screen transition pattern to a target screen node group that comprises at least part of the screen nodes illustrated in the screen transition diagram to provide a pattern-applied screen node group; and a screen transition structure diagram creating unit that creates a screen transition structure diagram by performing an abridgement processing on the pattern-applied screen node group in the screen transition diagram according to a display layout corresponding to the screen transition pattern. In the abridgement processing, the arrows are deleted and an icon that simplistically illustrates a transition pattern between the screen nodes displayed in the display layout is added. Therefore, the screen transition relations among a number of screens can be concisely shown in an easy-to-understand manner.

These and other objects, features, aspects and advantages of the present invention will become more apparent from the following detailed description of the present invention when taken in conjunction with the accompanying drawings.

BRIEF DESCRIPTION OF DRAWINGS

FIG. 4 shows a screen transition pattern.
FIG. 6 shows an abridged node layout according to the first embodiment.

FIG. 12 shows the screen transition abridgement information.

FIG. 13 shows display examples of the screen transition diagram and the screen transition structure diagram.

FIG. 15 shows the abridged node layout according to the second embodiment.

FIG. 16 shows display examples of screen nodes that are not abridged and the abridged node.

FIG. 19 shows an abridged node correspondence chart.

FIG. 26 shows the editing processing for the screen transition structure diagram.

FIG. 27 is a diagram showing the main configuration of the screen transition diagram creator according to a fourth embodiment.

DESCRIPTION OF EMBODIMENTS

First Embodiment

<Configuration>

Figure 1:
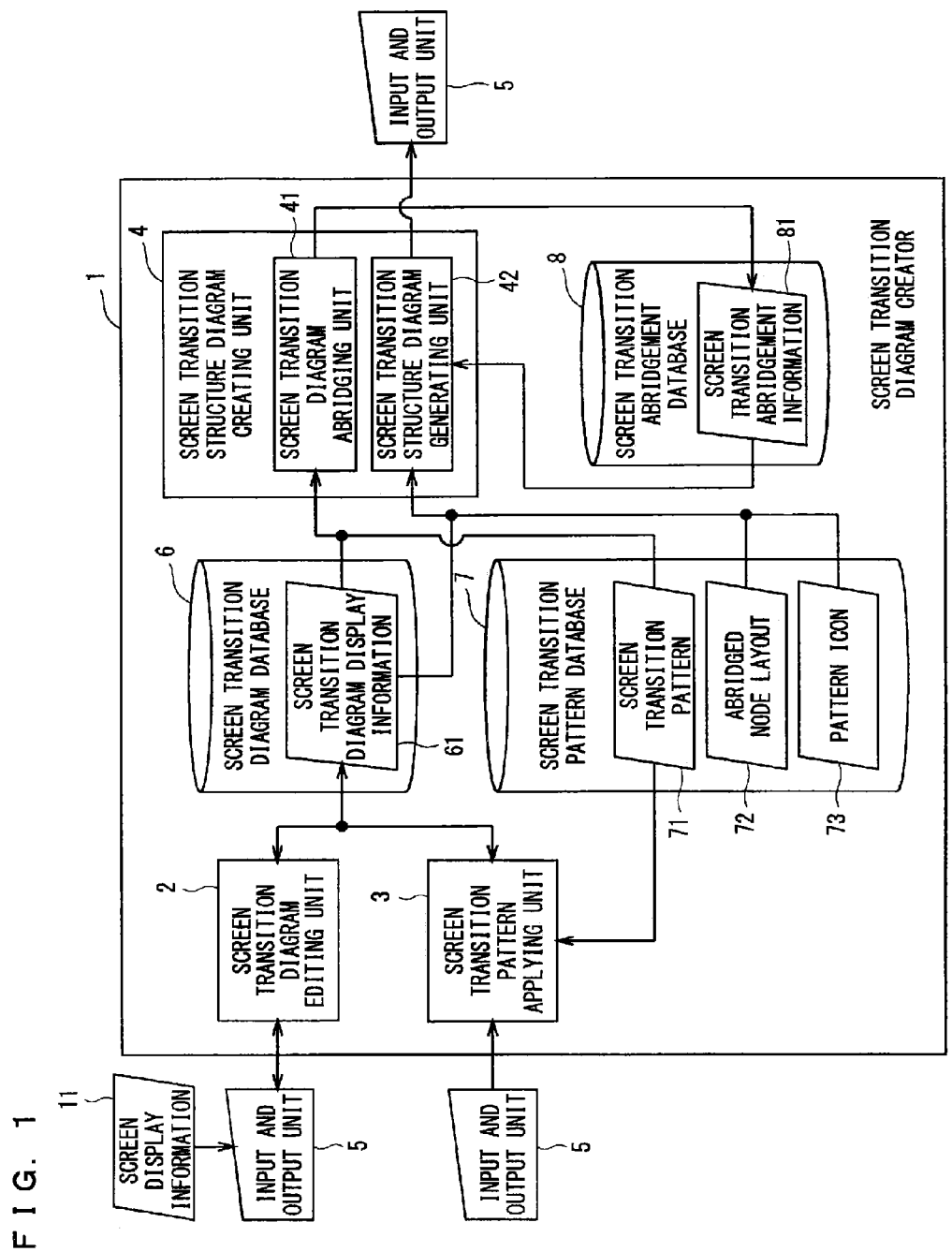
FIG. 1 is a configuration diagram of a screen transition diagram creator according to a first embodiment.

FIG. 1 is a configuration diagram of a screen transition diagram creator 1 according to a first embodiment. The screen transition diagram illustrates transition relations among a plurality of screens by a plurality of screen nodes and arrows (transition arcs) between the screen nodes. The screen transition diagram creator 1 creates a screen transition diagram from screen display information 11 that is input from an external unit, creates a screen transition structure diagram in which the screen transition diagram is concisely shown in an easy-to-understand manner, and outputs the screen transition structure diagram to the external unit.

The screen transition diagram creator 1 includes a screen transition diagram editing unit 2, a screen transition pattern applying unit 3, a screen transition structure diagram creating unit 4, an input and output unit 5, a screen transition diagram database 6, a screen transition pattern database 7, and a screen transition abridgement database 8.

The input and output unit 5, which serves as an input unit for the screen display information 11 and an output unit for the screen transition diagram and the screen transition structure diagram, may be located outside the screen transition diagram creator 1 as shown in FIG. 1 or may be located inside thereof.

The screen transition diagram editing unit 2 creates or edits a screen transition diagram in response to an input operation by the input and output unit 5 and outputs the screen transition diagram to the input and output unit 5. The screen transition diagram editing unit 2 operates as a screen transition diagram providing unit that provides the screen transition pattern applying unit 3 with the screen transition diagram to which a screen transition pattern described later is to be applied.

The screen transition pattern applying unit 3 applies a screen transition pattern 71 stored in the screen transition pattern database 7 to at least part of the screen nodes (target screen node group) shown in the screen transition diagram.

The screen transition structure diagram creating unit 4 performs an abridgement processing on the target screen node group (pattern-applied screen node group) with the screen transition pattern 71 applied thereto in the screen transition diagram, thereby creating the screen transition structure diagram. The abridgement processing herein refers to the simplistic displaying of the target screen node group according to an abridged node layout 72. The abridgement processing may also refer to the affixing of an icon that simplistically indicates the transition relation of the pattern-applied screen node group in addition to the simplistic displaying of the target screen node group. The screen transition structure diagram is output by the input and output unit 5. The screen transition structure diagram creating unit 4 causes the screen transition abridgement database 8 to store screen transition abridgement information 81 that indicates the abridgement information of the screen transition. The screen transition structure diagram creating unit 4 includes a screen transition diagram abridging unit 41 and a screen transition structure diagram generating unit 42.

The screen transition diagram database 6 stores screen transition diagram display information 61 serving as the display information of the screen transition diagram.

The screen transition pattern database 7 with the patterns of the screen transition recorded thereon stores the screen transition pattern 71, the abridged node layout 72, and a pattern icon 73.

The screen transition abridgement database 8 stores the screen transition abridgement information 81 serving as the abridgement information of the screen transition.

The screen transition diagram editing unit 2 extracts the information required in displaying the screen transition diagram from the screen display information 11 that is input by the input and output unit 5, to thereby create the screen transition diagram display information 61. The screen transition diagram display information that is created is recorded on the screen transition diagram database 6. The screen transition diagram editing unit 2 generates a screen transition diagram from the screen transition diagram display information 61 and outputs the screen transition diagram to the input and output unit 5. In a case where a user inputs an operation to change the screen transition diagram to the input and output unit 5, the screen transition diagram editing unit 2 changes the screen transition diagram display information 61 according to the operation, and then, the screen transition diagram display information 61 that is changed is recorded on the screen transition diagram database 6. Specifically, the screen transition diagram editing unit 2 changes the screen nodes and the list of transition destination screens.

The screen transition pattern applying unit 3 applies the screen transition pattern 71 to the target screen node group in the screen transition diagram according to the operation that is input by the input and output unit 5, so that the screen transition diagram display information 61 is changed and recorded on the screen transition diagram database 6.

The screen transition diagram abridging unit 41 abridges the pattern-applied screen node group with the screen transition pattern 71 applied thereto in the screen transition diagram, so that the screen transition abridgement information 81 is created and recorded on the screen transition abridgement database 8.

The screen transition structure diagram generating unit 42 displays the screen transition diagram in the abridged state according to the screen transition abridgement information 81 and the abridged node layout 72, and then, affixes the icon of the pattern icon 73 to the part displayed in the abridged state, providing the screen transition structure diagram. The screen transition structure diagram is output by the input and output unit 5.

The method is known by which the screen transition diagram editing unit 2 extracts the information required in displaying the screen transition diagram from the screen display information 11 and thereby creates the screen transition diagram display information 61. As described in Patent Document 1, for example, each screen in the screen display information 11 is provided as the screen node, the screens to which each screen is allowed to make transitions are provided in the list of transition destination screens, and the display position and the display size of the screen node are set according to the input operation by the input and output unit 5.

The method is known by which the screen transition diagram editing unit 2 generates the screen transition diagram from the screen transition diagram display information 61. As described in Patent Document 1, for example, each screen node in the screen transition diagram display information 61 is arranged according to the display position and the display size and an arrow (transition arc) is connected to the screen node corresponding to the list of transition destination screens.

The method is known by which the screen transition diagram editing unit 2 changes the screen node and the list of transition destination screens in the screen transition diagram display information 61. As described in Patent Document 1, for example, if the screen node is added or deleted or a transition arc is added, deleted, or connected to another screen node in the screen transition diagram according to the operation input by the input and output unit 5, the result is reflected to the screen transition diagram display information 61.

The method is known by which the screen transition pattern applying unit 3 applies the screen transition pattern 71 to a given screen group in the screen transition diagram and thereby changes the screen transition diagram display information 61. As described in Patent Document 1, for example, the transition arc of the screen node is added, deleted, or connected to a different part according to the screen transition method recorded in the screen transition pattern 71.

Figures 2, 3:
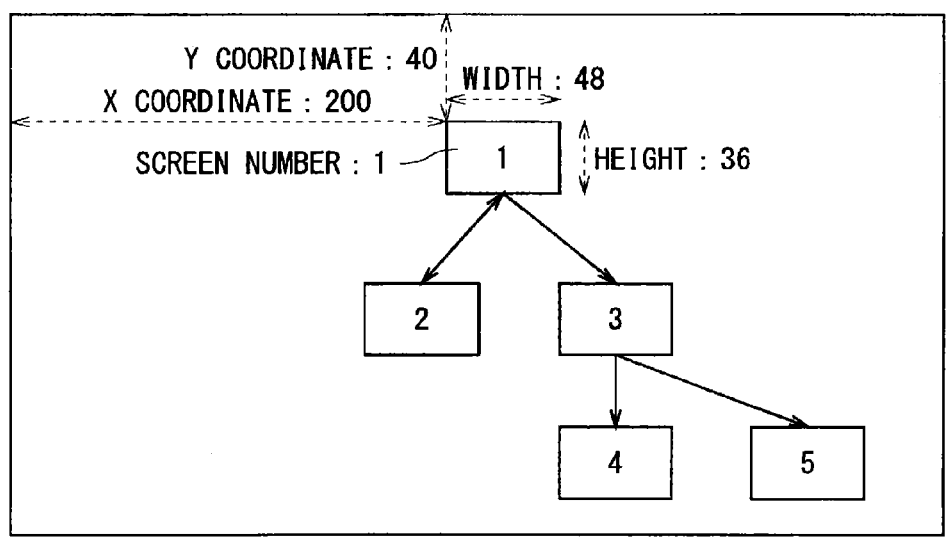
FIG. 2 shows screen transition diagram display information.
FIG. 3 shows a display example of a screen transition diagram.

FIG. 2 shows an example of the screen transition diagram display information 61 according to the first embodiment. The screen transition diagram display information 61, which is created for each screen node in the screen transition diagram, includes the information on the screen number, the X coordinate, the Y coordinate, the width, the height, and the list of transition destination screens. The screen number is the unique to each of the screen nodes and does not overlap among the screen nodes. The X coordinate and the Y coordinate indicate the display position of the screen node. The width and the height indicate the display size of the screen node. The list of transition destination screens indicates the screen numbers of the screen nodes to which the screen node concerned is allowed to make transitions. The list of transition destination screens is not provided for the screen numbers 4 and 5, indicating that the screen nodes of the screen numbers 4 and 5 have no transition destination.

FIG. 3 is an example of the screen transition diagram displayed by the input and output unit 5 that is generated according to the screen transition diagram display information 61 shown in FIG. 2.

FIG. 4 shows an example of the screen transition pattern 71 according to the first embodiment. The screen transition pattern 71 indicates the rules of transition to be followed by each screen node in the screen transition diagram. In FIG. 4, ○ indicates that the screen transition concerned is possible. For the target screen node group with the screen transition pattern 71 applied thereto, one representative screen is set, and besides, the alignment order of the screens other than the representative screen is set. In the item of "Transition from Representative Screen," if ○ is provided for "Transition to Top Screen," the representative screen is allowed to make a transition to the top screen in the alignment order of the screens other than the representative screen. If ○ is provided for "Transition to Last Screen," the representative screen is allowed to make a transition to the last screen in the alignment order of the screens other than the representative screen. If ○ is provided for "Transition to All Screens," the representative screen is allowed to make transitions to all the screens other than the representative screen. For the item of "Transition to Representative Screen," the transition origin and the transition destination in the item of "Transition from Representative Screen" switch places with each other. In the item of "Transitions between Screens Other Than Representative Screen," if ○ is provided for "Transitions in Ascending Order," the screens other than the representative screen are allowed to make transitions in the alignment order. If ○ is provided for "Transitions in Descending Order," the screens other than the representative screen are allowed to make transitions in the order opposite to the alignment order. In a case where ○ is provided for "Loop between Top screen and Last screen," ○ provided for "Transitions in Ascending Order" indicates that the last screen is allowed to make a transition to the top screen in the alignment order of the screens other than the representative screen and ○ provided for "Transitions in Descending Order" indicates the top screen is allowed to make a transition to the last screen in the alignment order of the screens other than the representative screen, both of which hold true for the case that the both items are marked with ○. In a case where ○ is provided for "Loop between Top Screen and Last Screen," the absence of ○ in the both items of "Transitions in Ascending Order" and "Transitions in Descending Order" could never happen. If ○ is provided for "Transitions between All Screens," the screens other than the representative screen are allowed to make transitions to one another.

Figure 5:
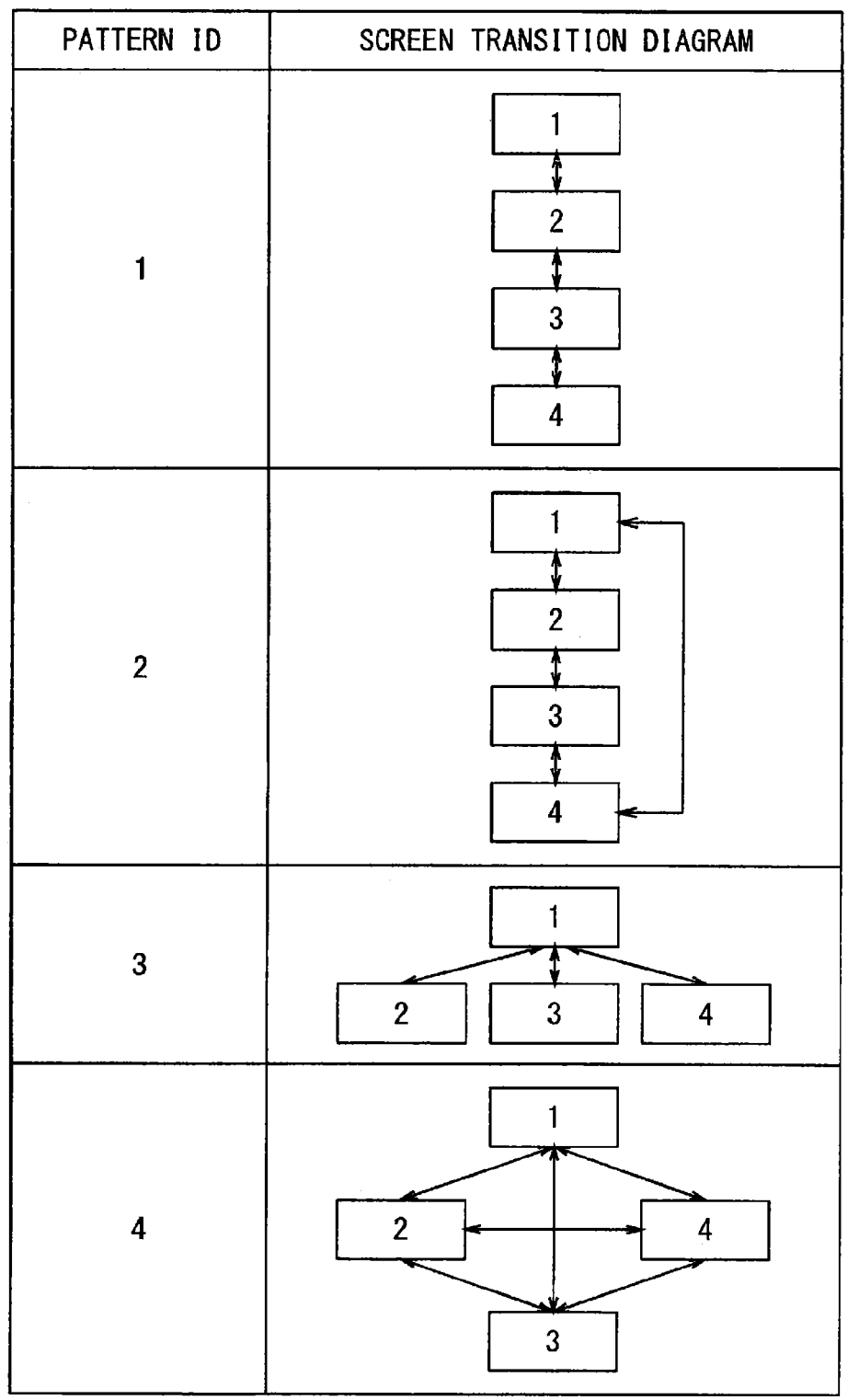
FIG. 5 shows a display example of the screen transition diagram with the screen transition pattern applied thereto.

FIG. 5 shows an example of the screen transition diagram for the case that the screen transition pattern 71 shown in FIG. 4 is applied to the screen group in which the screen 1 is provided as the representative screen and the screens 2, 3, and 4 in the stated order are provided as the screens other than the representative screen. In this case, the screen node having the screen number n is simply referred to as the screen n.

In a case where the pattern ID of "1" is provided, for example, the representative screen (the screen 1) is allowed to make a transition to the top screen (the screen 2) and a transition to the representative screen can be made by the top screen. The screens other than the representative screen is allowed to make a transition to another screen in ascending order (the following order: the screen 2, the screen 3, the screen 4) and in descending order (the following order: the screen 4, the screen 3, the screen 2).

FIG. 6 shows an example of the abridged node layout 72 according to the first embodiment. "Size of Representative Screen" indicates the width and the height of the representative screen to be displayed within the abridged node. "Position of Representative Screen" indicates the X coordinate and the Y coordinate of the representative screen to be displayed within the abridged node. If ○ is provided for the presence or absence of "Screens Other Than Representative Screen," the screens other than the representative screen are displayed within the abridged node. If x is provided, the screens other than the representative screen are not displayed. "Size of Screens Other Than Representative Screen" indicates the width and the height of the screens other than the representative screen to be displayed within the abridged node. "Position of Top Screen Other Than Representative Screen" indicates the X coordinate and the Y coordinate of the top screen, to be displayed within the abridged node, in the alignment order of the screens other than the representative screen. "Offset of Screens Subsequent to Top Screen" indicates the display position of the screens, to be displayed within the abridged node, that are subsequent to the top screen in the alignment order of the screens other than the representative screen. "Offset in X direction" is the value to be added to the X coordinate in displaying of the second screen and the following screens. "Offset in Y direction" is the value to be added to the Y coordinate each time the sequence number of the screen to be displayed exceeds the integral multiple of the return screen number. Each time the sequence number of the screen to be displayed exceeds the number of screens indicated by "Return Screen Number," the X coordinate is returned to the display position of the top screen and the offset in the Y direction is added to the Y coordinate. "Icon Size" indicates the width and the height of the pattern icon to be displayed within the abridged node. "Icon Position" indicates the X coordinate and the Y coordinate of the pattern icon to be displayed within the abridged node. If ○ is provided for the presence or absence of "Field Enclosure," a rectangle enclosing the screen is displayed in the abridged node. If x is provided, that rectangle enclosing the screen is not displayed. "Reference Size of Field" indicates the width and the height of the "Field Enclosure" to be displayed within the abridged node for the case that the screens other than the representative screen are not provided. Each time the number of screens other than the representative screen exceeds the integral multiple (including 0-fold) of the return screen number for the offset of the screens subsequent to the top screen, the offset in the Y direction for the offset of the screens subsequent to the top screen is added to the height of the field enclosure to be displayed. If ○ is provided for the presence or absence of "Partition Line," the line segment that separates the representative screen and the screens other than the representative screen in the abridged node is displayed. If x is provided, the line segment is not displayed. "Starting-Point Position of Partition Line" indicates the X coordinate and the Y coordinate of the starting point of the line segment for the case that the partition line is displayed within the abridged node. "Endpoint Position of Partition Line" indicates the X coordinate and the Y coordinate of the endpoint of the line segment for the case that the partition line is displayed within the abridged node.

Figure 7:
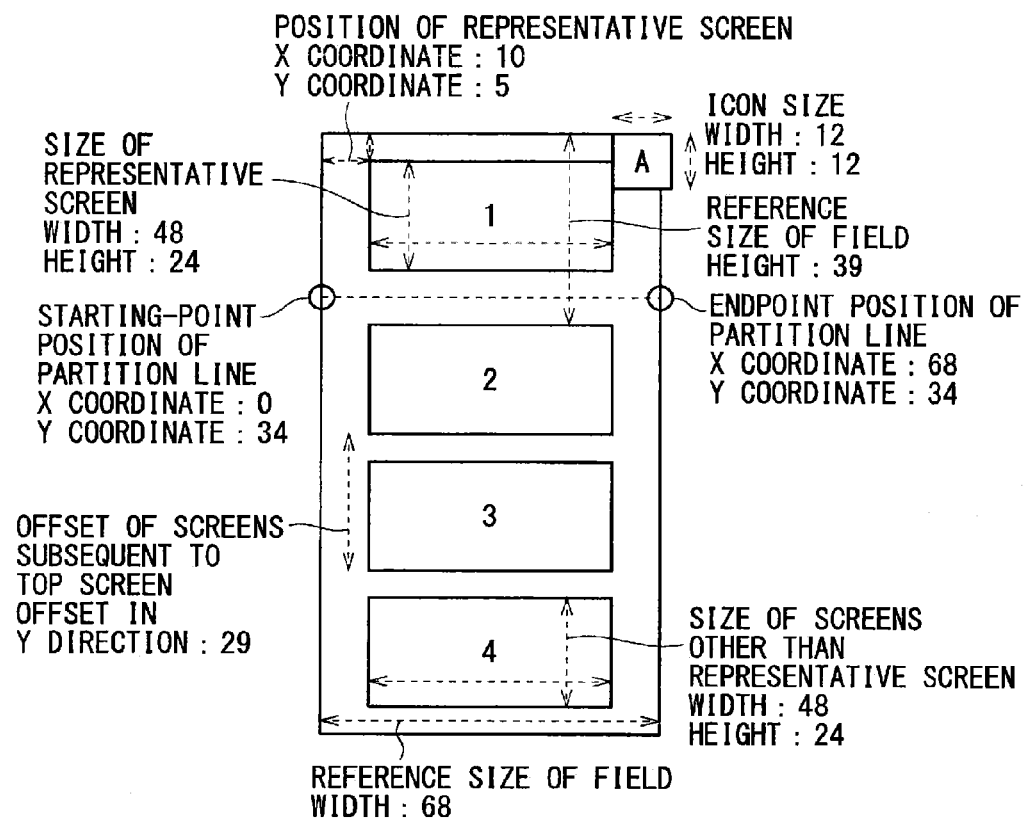
FIG. 7 shows a display example of an abridged node.

FIG. 7 shows a display example of the abridged node for the case that the abridged node layout 72 with the pattern ID of "1" shown in FIG. 6 is applied to the screen group in which the screen 1 is provided as the representative screen and the screens 2, 3, and 4 in the stated order are provided as the screens other than the representative screen. The icon corresponding to the pattern ID of the pattern icon 73 is displayed at the part indicated by "A" in FIG. 7.

Figures 8, 9:
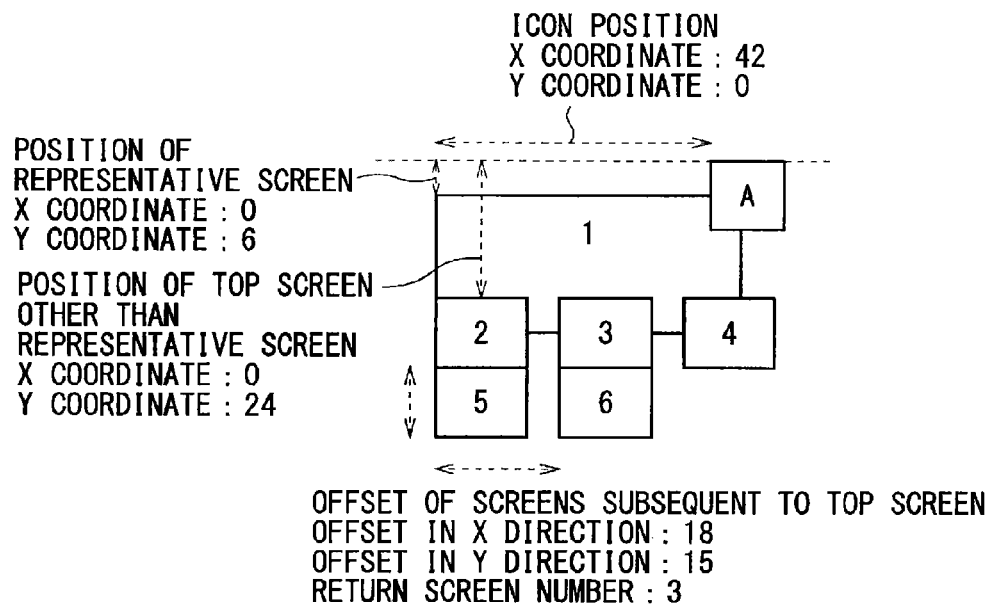
FIG. 8 shows a display example of the abridged node.
FIG. 9 shows a pattern icon.

FIG. 8 shows a display example of the abridged node for the case that the abridged node layout 72 with the pattern ID of "3" shown in FIG. 6 is applied to the screen group in which the screen 1 is provided as the representative screen and the screens 2, 3, 4, 5, and 6 in the stated order are provided as the screens other than the representative screen. The icon corresponding to the pattern ID of the pattern icon 73 is displayed at the part indicated by "A" in FIG. 8.

FIG. 9 shows the pattern icon 73 stored in the screen transition pattern database 7. In the pattern icon 73, the pattern IDs and the image data of the icons are associated with each other. According to the screen transition pattern in which the pattern ID of "1" is provided, the top screen is the only screen that makes transitions from and to the representative screen, the screens other than the representative screen make transitions in ascending order and in descending order, and the loop between the top screen and the last screen is not provided, so that the screens are capable of making transitions between each other in ascending order from the representative screen and in descending order. Thus, the screen transition diagram in which the screen nodes are arranged in the straight line is easy to follow because the transition arcs do not intersect one another. Therefore, the straight line with arrows added to the both ends, which effectively visualizes the two-way screen transitions between the screens, is provided as the icon image. As described above, to visualize the screen transition pattern, the icon image of the pattern icon 73 is desirably patterned after the structure of the screen transition before abridgement.

<Operation>

Figure 10:
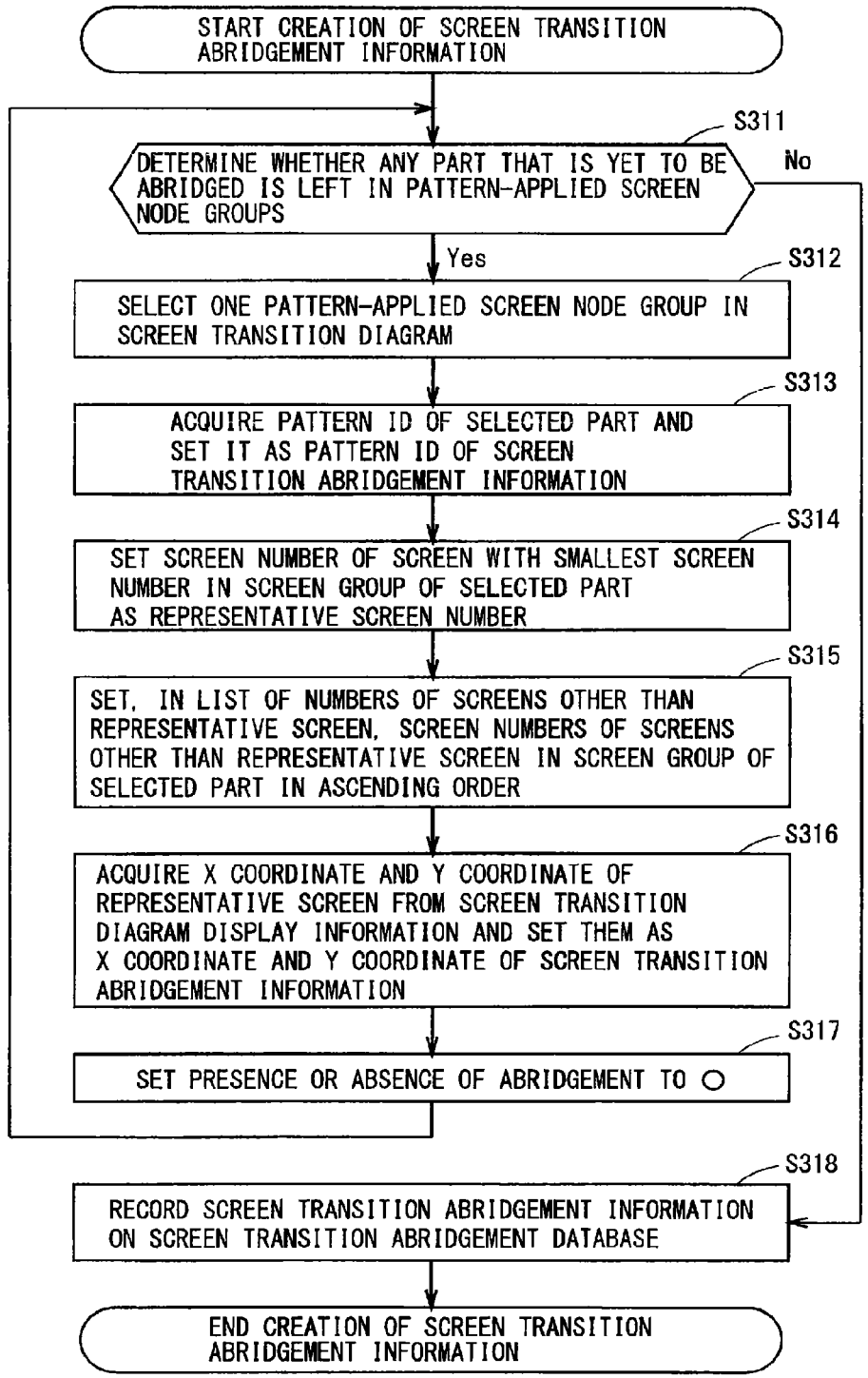
FIG. 10 is a flowchart showing a creation processing for screen transition abridgement information.

FIG. 10 is a flowchart showing a creation processing for the screen transition abridgement information 81. The screen transition diagram abridging unit 41 abridges the pattern-applied screen node groups in the screen transition diagram, to thereby create the screen transition abridgement information 81.

Firstly, a determination is made whether any part that is yet to be abridged is left in the pattern-applied screen node groups in the screen transition diagram (step S311). If a yet-to-be abridged part is left, the processing proceeds to a step S312. If a yet-to-be abridged part is not left, the processing proceeds to a step 318.

In a case where the yet-to-be abridged part is left (Yes in the step S311), one part of the pattern-applied screen node groups that is yet to be abridged is selected (the step S312). The selection may be made in any way. For example, the part including less screen nodes may be selected.

Next, the pattern ID of the screen transition pattern applied to the part selected in the step S312 is acquired from the screen transition pattern database 7 and is set as the pattern ID of the screen transition abridgement information 81 (step S313).

Then, the screen number of the screen with the smallest screen number in the screen group of the part selected in the step S312 is set as the representative screen number of the screen transition abridgement information 81 (step S314).

The screen numbers of the screens other than the screen set as the representative screen in the screen group of the part selected in the step S312 are set in the list of numbers of the screens other than the representative screen of the screen transition abridgement information 81 in ascending order (step S315).

After that, the X coordinate and the Y coordinate of the representative screen are acquired from the screen transition diagram display information 61 and are set as the X coordinate and the Y coordinate of the screen transition abridgement information 81 (step S316). The presence or absence of the screen transition abridgement information 81 is set to ○ (step S317).

Then, the processing returns to the step S311 to determine whether any part that is yet to be abridged is left in the pattern-applied screen node groups. If all parts have been abridged, the screen transition abridgement information 81 is recorded on the screen transition abridgement database 8 (the step S318), and then, the processing ends.

Figure 11:
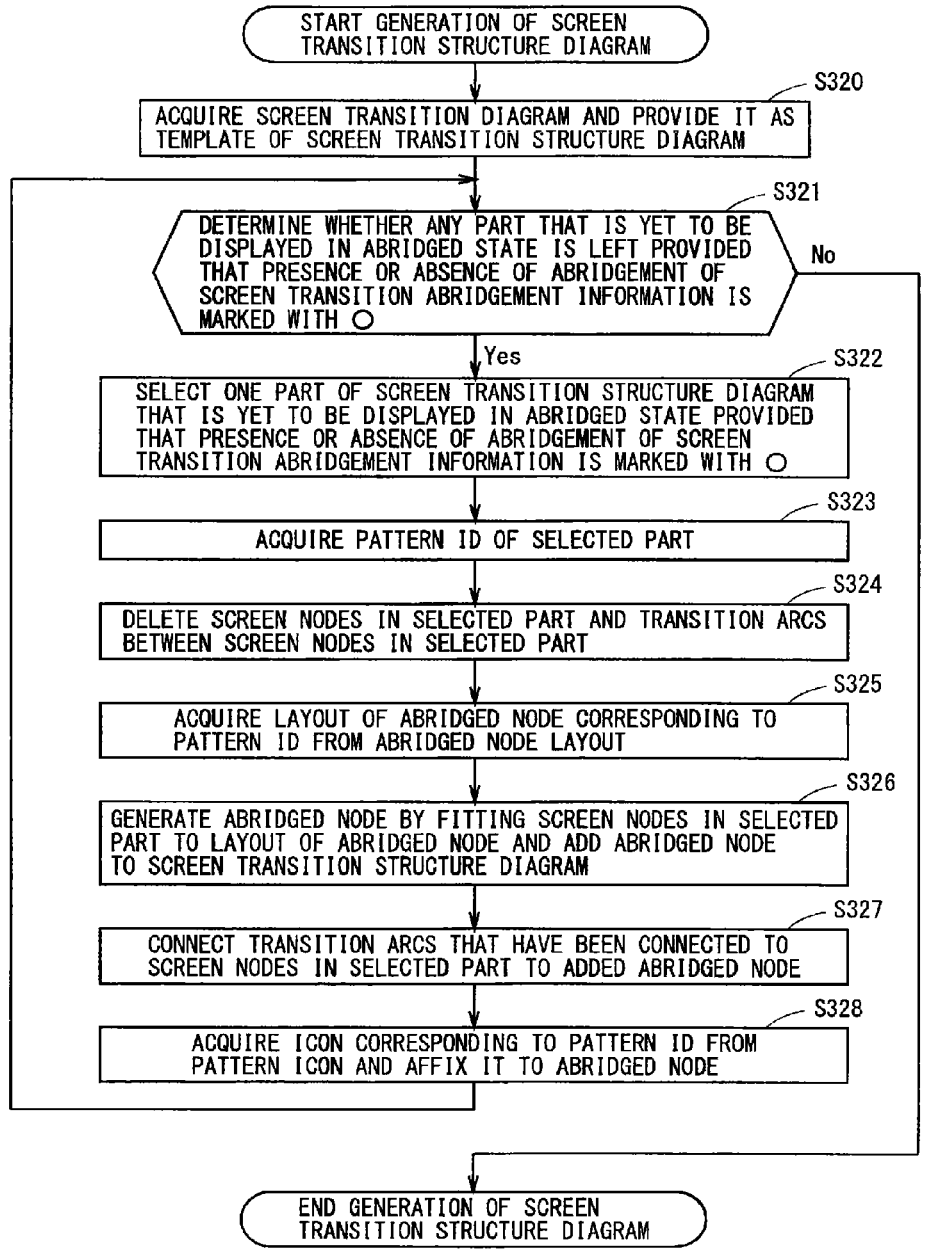
FIG. 11 is a flowchart showing a generation processing for a screen transition structure diagram according to the first embodiment.

FIG. 11 is a flowchart showing the processing in which the screen transition structure diagram generating unit 42 generates the screen transition structure diagram from the screen transition diagram. The screen transition structure diagram generating unit 42 displays the screen transition diagram in the abridged state according to the screen transition abridgement information 81 and the abridged node layout 72, and then, affixes the icon of the pattern icon 73, providing the screen transition structure diagram.

Firstly, the screen transition diagram display information 61 is acquired from the screen transition diagram database 6 and the screen transition diagram obtained from the screen transition diagram display information 61 is provided as the template of the screen transition structure diagram (step S320).

Next, a determination is made whether any part that is yet to be displayed in the abridged state is left in the screen structure diagram provided that the presence or absence of abridgement of the screen transition abridgement information 81 is marked with ○ (step S321). If no part is left, the generation processing for the screen transition structure diagram ends.

If the part that is yet to be displayed in the abridged state is left (Yes in the step S321), one part of the screen transition structure diagram that is not displayed in the abridged state is selected provided that the presence or absence of abridgement of the screen transition abridgement information 81 is marked with ○ (step S322). The selection may be made in any way. For example, the part with less screen nodes included in the screen transition pattern may be selected.

Next, the pattern ID of the screen transition abridgement information 81 of the part of the screen transition structure diagram selected in the step S322 is acquired (step S323).

The screen nodes in the part of the screen transition structure diagram selected in the step S322 and the transition arcs between the screen nodes in the selected part are entirely deleted (step S324).

After that, the layout of the abridged node corresponding to the pattern ID acquired in the step S323 is acquired from the abridged node layout 72 (step S325).

Then, the screen nodes are fitted to the layout of the abridged node acquired in the step S325 according to the representative screen number and the list of numbers of the screens other than the representative screen of the screen transition abridgement information 81, to thereby generate the abridged node and the abridged node is added to the screen transition structure diagram (step S326). The position to which the abridged node is to be added is defined by the X coordinate and the Y coordinate recorded in the screen transition abridgement information 81.

Next, the transition arcs that have been connected to the screen nodes in the part selected in the step S322 are connected to the abridged node added in the step S326 (step S327).

Lastly, the icon corresponding to the pattern ID acquired in the step S323 is acquired from the pattern icon 73 and is affixed to the abridged node added in the step S326 (step S328).

FIG. 12 shows an example of the screen transition abridgement information 81. The screen transition abridgement number is unique to each of the screen transition abridgements and does not overlap among the screen transition abridgements. The pattern ID indicates the ID of the screen transition pattern corresponding to the screen transition abridgement concerned in the screen transition pattern 71 stored in the screen transition pattern database 7. The X coordinate and the Y coordinate indicate the display position of the abridged node to be displayed. The representative screen number indicates the screen number of the representative screen of the screen transition abridgement. In the list of numbers of the screens other than the representative screen, the screen numbers of the screens other than the representative screen of the screen transition abridgement are listed in the alignment order of the screens.

FIG. 13 shows an example of the screen transition structure diagram generated by abridging the screen transition diagram according to the screen transition abridgement information 81 shown in FIG. 12. In the screen transition abridgement information 81, the presence or absence of abridgement is marked with ○ as for the screen transition abridgement number 1. Therefore, the screen node having the representative screen number 2 and the screen nodes having the screen numbers 3, 4, and 5 included in the list of numbers of the screens other than the representative screen are displayed in the abridged state according to the layout of the abridged node corresponding to the pattern ID of "1" in the abridged node layout 72. The abridged node is displayed at the position given by the X coordinate of 150 and the Y coordinate of 150 according to the screen transition abridgement information 81. Next, the presence or absence of abridgement is marked with x as for the screen transition abridgement number 2. Therefore, the screen node having the representative screen number 6 and the screen nodes having the screen numbers 7 and 8 included in the list of numbers of the screens other than the representative screen are not displayed in the abridged state but are displayed in the original state.

<Effects>

The screen transition diagram creator 1 according to this embodiment includes: the screen transition diagram editing unit 2 (screen transition diagram providing unit) that provides the screen transition diagram in which the transition relations among the plurality of screens are illustrated by the plurality of screen nodes and the arrows between the screen nodes; the screen transition pattern applying unit 3 that applies the predetermined screen transition pattern to the target screen node group that comprises at least part of the screen nodes illustrated in the screen transition diagram to provide the pattern-applied screen node group; and the screen transition structure diagram creating unit 4 that creates the screen transition structure diagram by performing the abridgement processing on the pattern-applied screen node group in the screen transition diagram according to the display layout corresponding to the screen transition pattern. In the abridgement processing, the arrows are deleted and the icon that simplistically illustrates the transition pattern between the screen nodes displayed in the display layout is added. Thus, the screen transition structure diagram that is structured and easy to follow can be provided even for the complicated screen transition diagram, whereby the screen transition structure can be easily grasped.

At least one representative screen is saved in the abridgement processing, allowing for simplistic illustration of the target screen node group.

Second Embodiment

The screen transition diagram creator 1 according to the first embodiment has included one abridged node layout per screen transition pattern. Meanwhile, a screen transition diagram creator 10 according to a second embodiment includes a plurality of abridged node layouts that differ in the degree of abridgement (the degree of simplicity of display) per screen transition pattern.

<Configuration>

Figure 14:
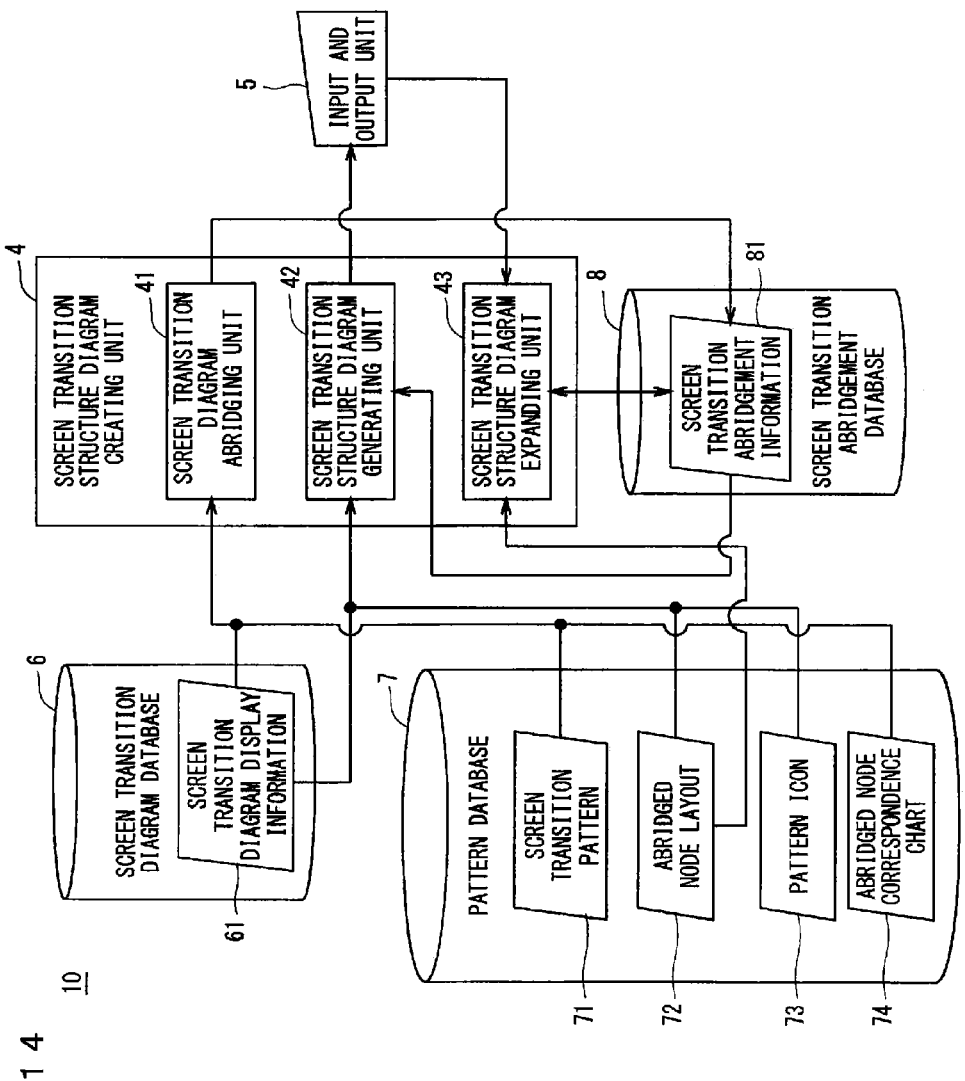
FIG. 14 is a diagram showing the main configuration of the screen transition diagram creator according to a second embodiment.

FIG. 14 is a diagram showing a main configuration of the screen transition diagram creator 10 according to the second embodiment.

The screen transition diagram creator 10 according to the second embodiment differs from the configuration of the screen transition diagram creator 1 according to the first embodiment in that the screen transition structure diagram creating unit 4 includes a screen transition structure diagram expanding unit 43 and the screen transition pattern database 7 stores an abridged node correspondence chart 74. The configuration except for the above is similar to that of the screen transition diagram creator 1. The screen transition diagram editing unit 2 and the screen transition pattern applying unit 3 are not shown in FIG. 14.

The abridged node layout 72 includes a plurality of abridged node layouts per pattern ID.

The screen transition structure diagram expanding unit 43 changes the abridged node that is abridged according to the screen transition abridgement information 81 or the screen nodes in the original state without being abridged in the screen transition structure diagram into the layout of another abridged node corresponding to the pattern ID of the abridged node layout 72 or into the screen nodes in the original state without being abridged. The decision as to which one of the abridged node layouts the node is changed into or the decision on whether to change the node into the screen nodes in the original state is made according to the input operation by the input and output unit 5. The number of the abridged node layout into which the node is changed may be recorded in the screen transition abridgement information 81.

In addition, the abridged node correspondence chart 74 that serves as the rule for selecting the layout of the abridged node from the abridged node layout 72 may be recorded on the screen transition pattern database 7, so that the layout of the abridged node may be automatically selected according to the abridged node correspondence chart 74 when the screen transition structure diagram generating unit 42 generates the screen transition structure diagram by displaying the screen transition diagram in the abridged state. In a case where the layout of the abridged node is determined by the input operation by the input and output unit 5, the abridged node correspondence chart 74 may not be included.

FIG. 15 shows an example of the abridged node layout 72 in which a plurality of the abridged node layouts are recorded per pattern ID. The abridged node number is the identification number that uniquely fixes the abridged node with respect to a single pattern ID.

FIG. 16 shows, as an example, diagrams displayed by the input and output unit 5, illustrating the abridged node and the screen nodes in the original state without being abridged for the case that the abridged node layout 72 shown in FIG. 15 is applied to the pattern-applied screen node group in which the screen 1 is provided as the representative screen and the screens 2, 3, and 4 in the stated order are provided as the screens other than the representative screen. The icon corresponding to the pattern ID of the pattern icon 73 is displayed at the part indicated by "A" in the drawing.

<Operation>

Figure 17:
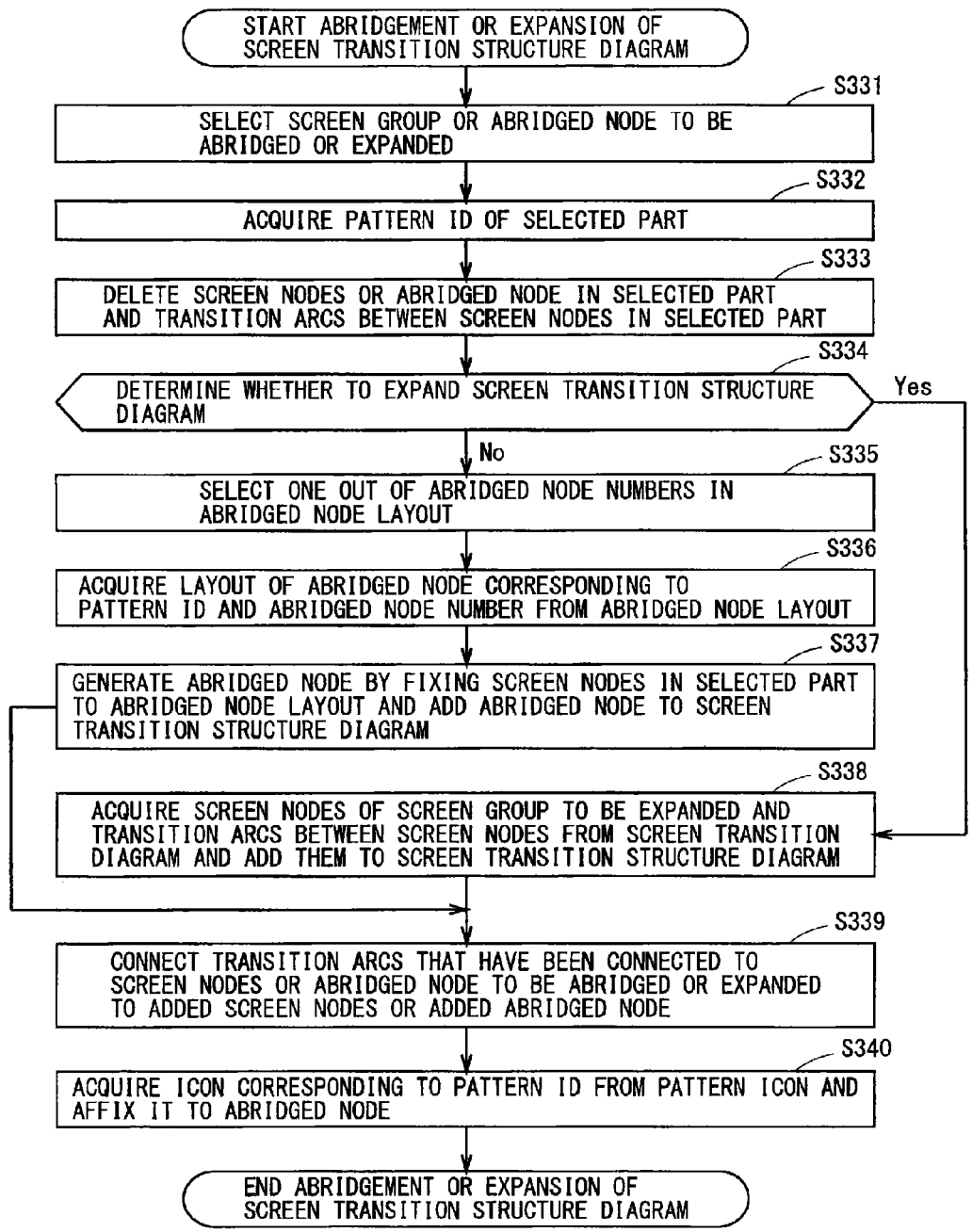
FIG. 17 is a flowchart showing an operation of a screen transition structure diagram expanding unit.

FIG. 17 is a flowchart showing the processing in which the screen transition structure diagram expanding unit 43 abridges or expands the screen transition structure diagram. The screen transition structure diagram expanding unit 43 changes the abridged node that is abridged according to the screen transition abridgement information 81 or the screen nodes in the original state without being abridged in the screen transition structure diagram into the layout of another abridged node corresponding to the pattern ID of the abridged node layout 72 or into the screen nodes in the original state without being abridged, to thereby abridge or expand the screen transition structure diagram.

Firstly, the abridged node or the screen nodes in the original state that is or are to be abridged or to be expanded in the screen transition structure diagram is or are selected according to the operation input by the input and output unit 5 (step S331).

Next, the pattern ID of the screen transition abridgement information 81 that is applied to the part selected in the step S331 (hereinafter referred to as the "selected part") is acquired (step S332).

Then, the screen nodes in the selected part and the transition arcs between the screen nodes in the selected part are entirely deleted or the abridged node is entirely deleted (step S333).

Next, a determination is made whether to expand the screen group in the selected part or whether to expand the abridged node in the selected part (step S334). When the expansion is not executed, in other words, when the abridgement is executed, one of the abridged node numbers in the abridged node layout 72 is selected according to the operation input by the input and output unit 5 (step S335).

Subsequently, the layout of the abridged node corresponding to the pattern ID acquired in the step S332 and to the abridged node number selected in the step S335 is acquired from the abridged node layout 72 (step S336).

After that, the abridged node is generated by fixing the screen nodes to the abridged node layout acquired in the step S336 according to the representative screen number and the list of numbers of the screens other than the representative screen in the screen transition abridgement information 81, and then, the abridged node is added to the screen transition structure diagram (step S337). The position to which the abridged node is to be added is defined by the X coordinate and the Y coordinate recorded in the screen transition abridgement information 81.

In a case where the screen transition structure diagram is expanded (Yes in the step S344), the screen nodes of the screen group to be expanded and the transition arcs between the screen nodes to be expanded are acquired from the screen transition diagram and are added to the screen transition structure diagram (step S338).

After the step S337 or the step S338, the transition arcs that have been connected to the screen nodes or the abridged node to be abridged or expanded in the screen transition structure diagram are connected to the abridged node added in the step S337 or to the screen nodes added in the step S338 (step S339).

Lastly, the icon corresponding to the pattern ID acquired in the step S332 is acquired from the pattern icon 73 and is affixed to the abridged node added in the step S337 (step S340). In a case where the screen transition structure diagram is expanded, no icon is affixed.

Figure 18:
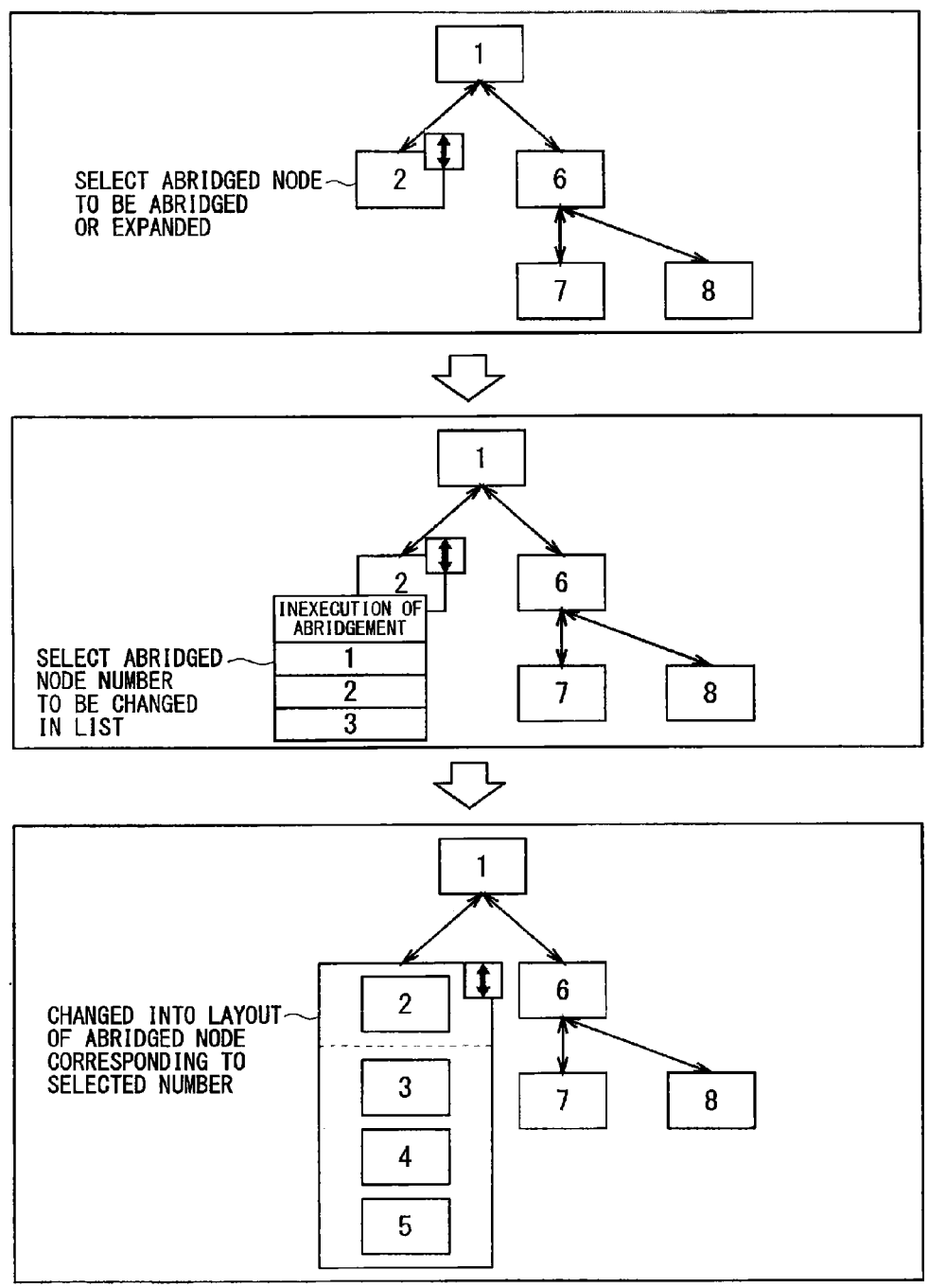
FIG. 18 shows a state in which the abridged node in the screen transition structure diagram is changed into a layout of another abridged node number.

FIG. 18 shows the screen transition structure diagrams in a case where the abridged node with the layout of the abridged node number 1 in the abridged node layout 72 shown in FIG. 15 applied thereto is changed into the layout of the abridged node number 3. When the abridged node of the representative screen number 2 that is abridged according to the abridged node number 1 is selected in the input and output unit 5, the list for specifying the abridged node number or the inexecution of abridgement is displayed. When the abridged node number 3 is specified, for example, the abridged node layout of the selected abridged node is changed into the abridged node layout corresponding to the abridged node number 3. Therefore, the user can change the degree of abridgement. If the inexecution of abridgement in the list is specified in the example described above, the abridge node can be expanded and returned to the screen nodes in the original state.

FIG. 19 shows an example of the abridged node correspondence chart 74. The abridged node number is the number of the abridged node to be applied for each condition determined by the screen transition structure diagram generating unit 42. In a case where the abridged node number is 0, the screen nodes in the original state without being abridged are applied.

Figure 20:
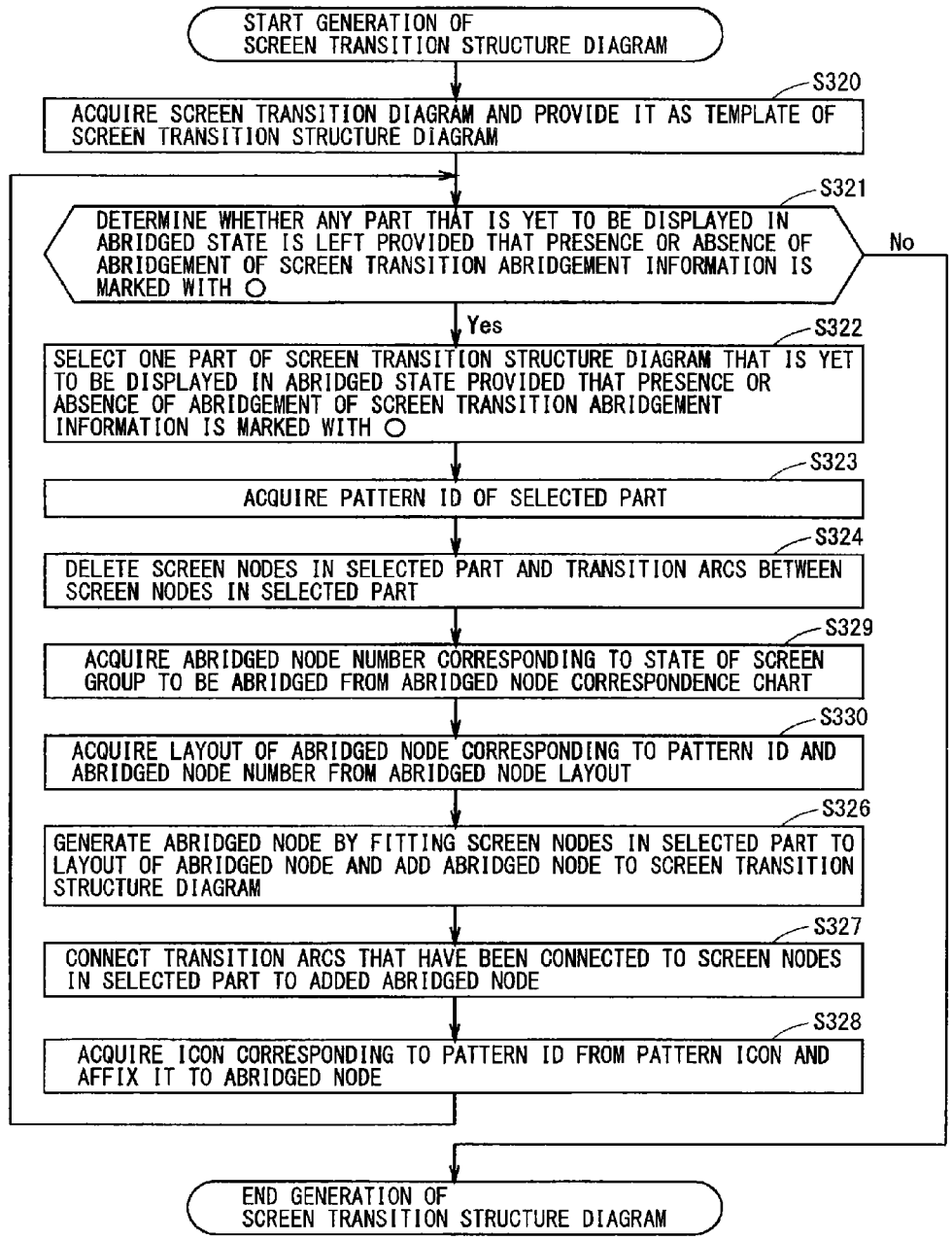
FIG. 20 is a flowchart showing the generation processing for the screen transition structure diagram according to the second embodiment.

FIG. 20 is a flowchart showing the processing in which the screen transition structure diagram generating unit 42 generates the screen transition structure diagram by displaying the screen transition diagram in the abridged state according to the screen transition abridgement information 81, the abridged node layout 72, and the abridged node correspondence chart 74. The flowchart differs from the flowchart of FIG. 11 in that steps S329 and S330 are provided. Thus, the following description will be given exclusively on the step S329 and the S330.

The steps S320 to S324 are similar to those of the flowchart of FIG. 11. After the step S324, the abridged node number corresponding to the state of the screen group to be abridged is acquired from the abridged node correspondence chart 74 (step S329). Then, the layout of the abridged node corresponding to the pattern ID acquired in the step S324 and to the abridged node number acquired in the step 329 is acquired from the abridged node layout 72 (step S330). After that, the abridgement processing is performed as in FIG. 11.

Figure 21:
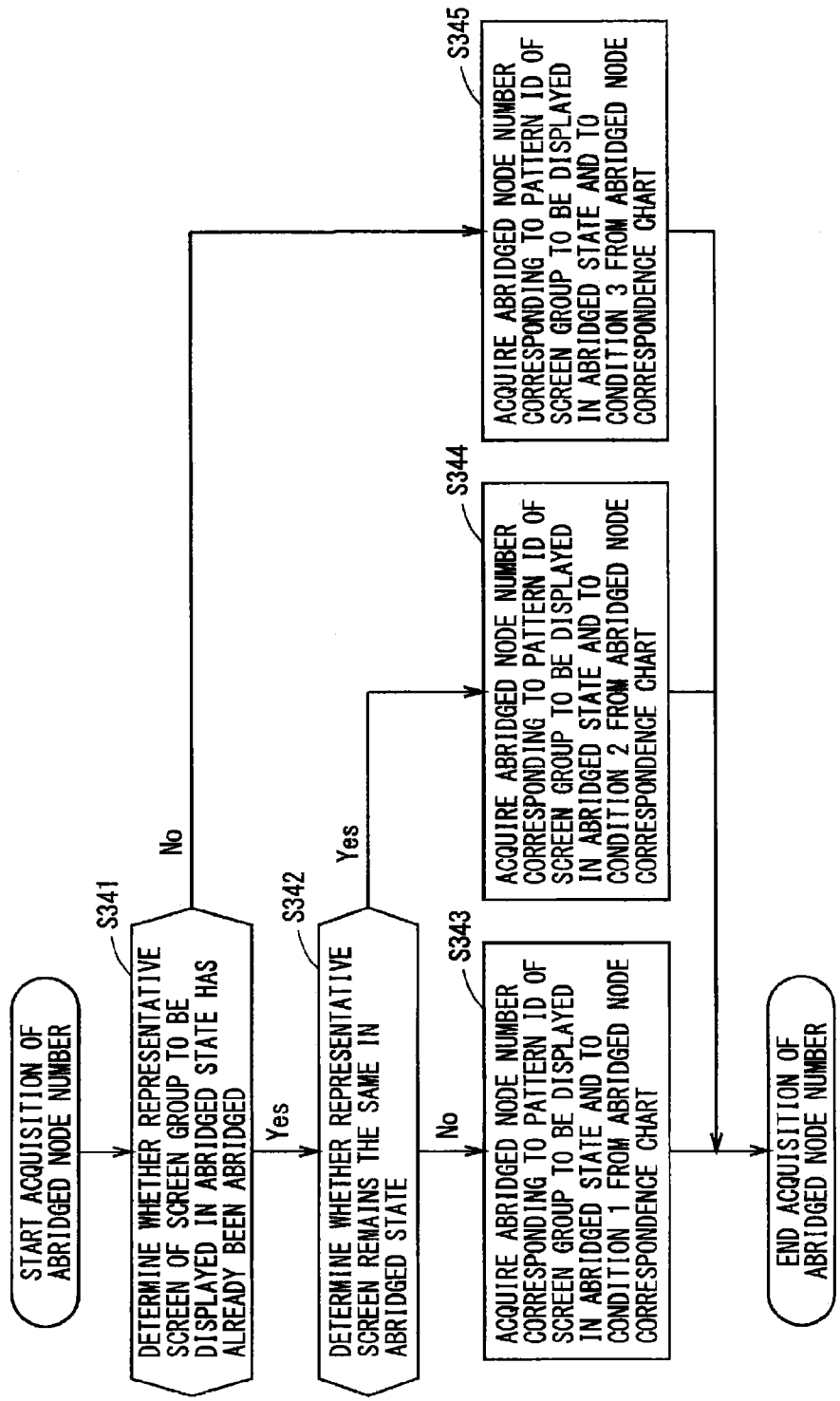
FIG. 21 is a flowchart showing an acquisition processing for the abridged node number according to the second embodiment.

FIG. 21 is a flowchart showing an example of the processing (the step S329 in FIG. 20) for acquiring the abridged node number corresponding to the state of the screen group to be abridged from the abridged node correspondence chart 74.

A determination is made on whether the representative screen of the screen group to be displayed in the abridged state has already been abridged (step S341). If abridgement has not been executed, the abridged node number corresponding to the pattern ID of the screen group to be displayed in the abridged state and to the condition 3 is acquired from the abridged node correspondence chart 74 (step S345).

Assuming that it is determined in the step S341 that the representative screen has been abridged, a determination is made on whether the representative screen remains the same in the abridged state (step S342). If the representative screen remains the same, the abridged node number corresponding to the pattern ID of the screen group to be displayed in the abridged state and to the condition 2 is acquired from the abridged node correspondence chart 74 (step S344).

If it is determined in the step S342 that the representative screen does not remain the same, the abridged node number corresponding to the pattern ID of the screen group to be displayed in the abridged state and to the condition 1 is acquired from the abridged node correspondence chart 74 (step S343).

<Effects>

In the screen transition diagram creator 10 according to this embodiment, the plurality of display layouts are provided corresponding to the screen transition pattern and the screen transition structure diagram creating unit 4 performs the abridged displaying with the display layout specified through the external input operation. Thus, the abridged node is changed into the layout of another abridged node or into the screen nodes in the original state without being abridged. Therefore, the layout of the abridged node can be switched for checking of the screen transition of the abridged part, thereby facilitating the grasping of the screen transition.

In the screen transition diagram creator 10 according to this embodiment, the plurality of display layouts are provided corresponding to the screen transition pattern and the screen transition structure diagram creating unit 4 performs the abridged displaying with the display layout that is selected according to the predetermined condition. Therefore, the layout of the abridged node is automatically selected, thereby facilitating the creation of the screen transition structure diagram.

Third Embodiment

A third embodiment allows the editing of the screen transition structure diagram through the input operation by the input and output unit 5.

<Configuration>

Figure 22:
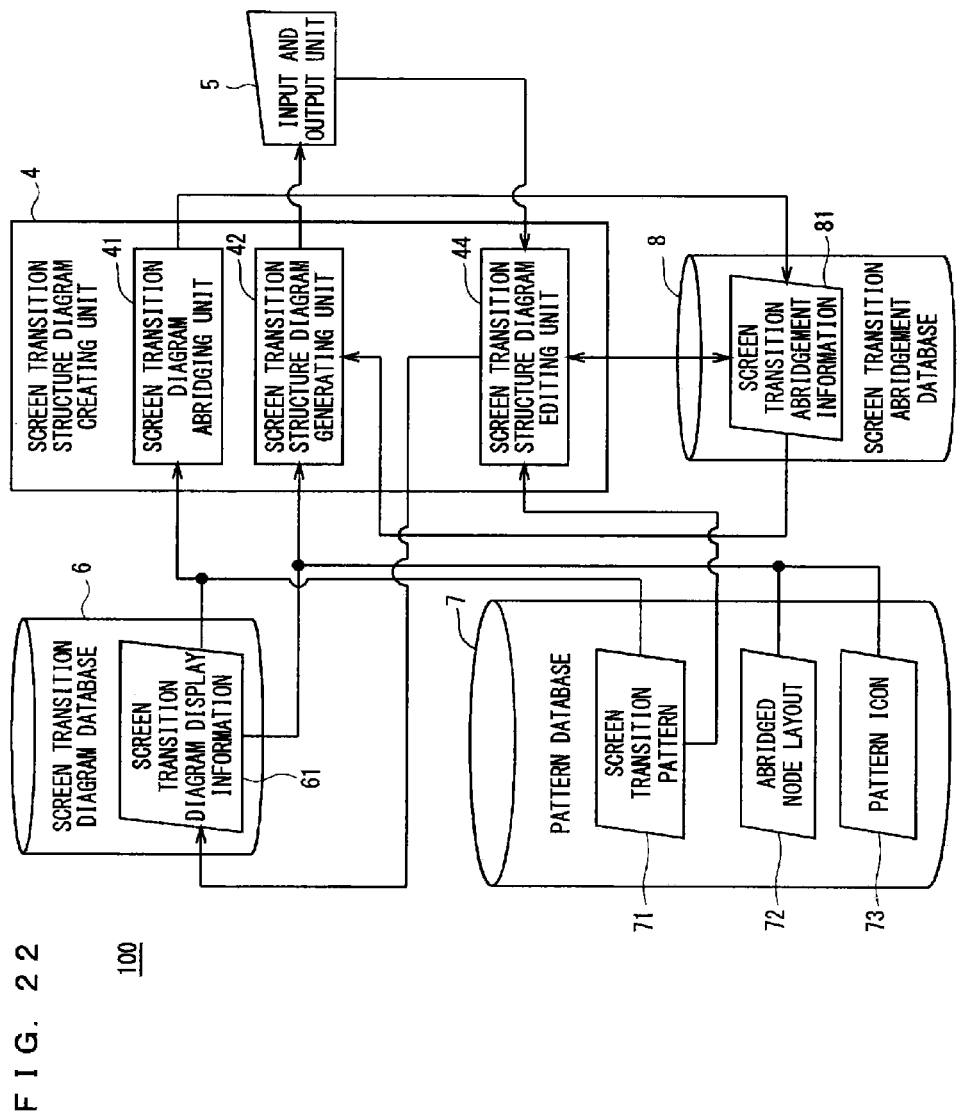
FIG. 22 is a diagram showing the main configuration of the screen transition diagram creator according to a third embodiment.

FIG. 22 is a diagram showing a main configuration of a screen transition diagram creator 100 according to the third embodiment. The screen transition diagram creator 100 according to the third embodiment differs from the configuration of the screen transition diagram creator 1 according to the first embodiment in that the screen transition structure diagram creating unit 4 includes a screen transition structure diagram editing unit 44. The configuration except for the above is similar to that of the screen transition diagram creator 1. The screen transition diagram editing unit 2 and the screen transition pattern applying unit 3 are not shown in FIG. 22.

<Operation>

Figure 23:
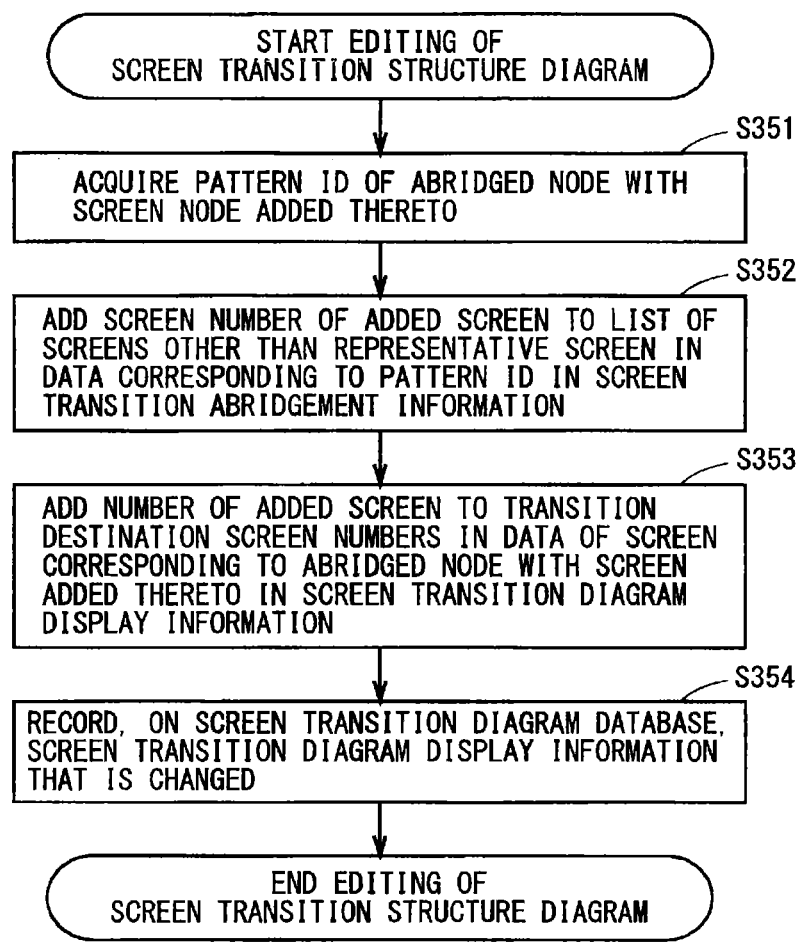
FIG. 23 is a flowchart showing an editing processing for the screen transition structure diagram.

FIG. 23 is a flowchart showing the following processing. When the screen node is added to the abridged node in the screen transition structure diagram according to the input operation by the input and output unit 5, the screen transition structure diagram editing unit 44 changes the screen transition abridgement information 81, and then, changes the screen transition diagram display information 61 according to the change of the screen transition abridgement information 81 and to the screen transition pattern 71.

Firstly, the pattern ID of the abridged node in the screen transition structure diagram with the screen node added thereto is acquired (step S351).

Next, in the screen transition abridgement information 81, the screen number of the added screen node is added to the "list of the screens other than the representative screen" in the data corresponding to the pattern ID acquired in the step S351 (step S352).

Then, in the screen transition diagram display information 61, the screen number of the added screen node is added to the transition destination screen numbers in the data of the screen in the screen transition pattern corresponding to the abridged node with the screen node added thereto (Step S353). The screen node serving as the transition origin of the added screen node is determined according to the screen transition pattern 71.

Lastly, the screen transition diagram display information 61 changed in the step S353 is recorded on the screen transition diagram database 6 (step S354), and then, the processing ends.

Figure 24:
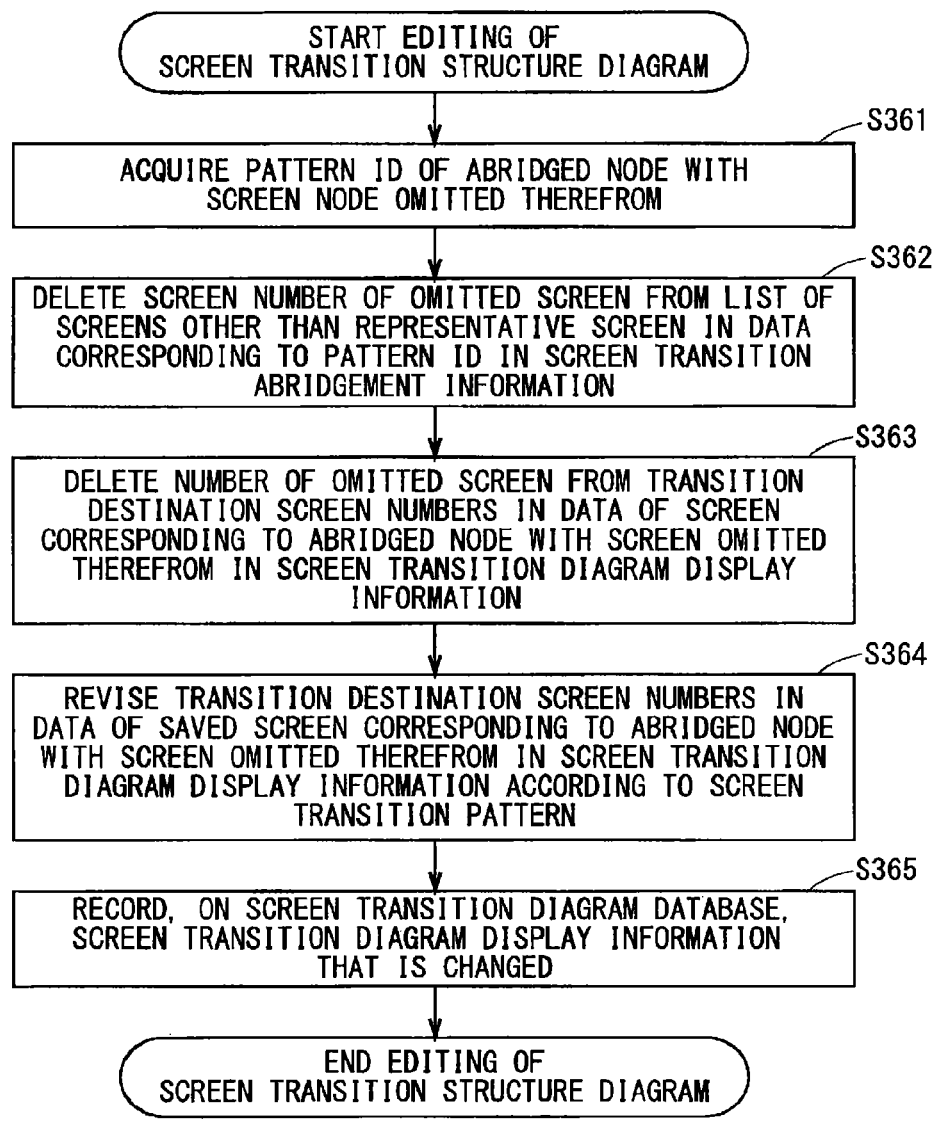
FIG. 24 is a flowchart showing the editing processing for the screen transition structure diagram.

FIG. 24 is a flowchart showing the following method. When the screen node is omitted from the abridged node in the screen transition diagram according to the input operation by the input and output unit 5, the screen transition structure diagram editing unit 44 changes the screen transition abridgement information 81, and then, changes the screen transition diagram display information 61 according to the change of the screen transition abridgement information 81 and to the screen transition pattern 71.

Firstly, the pattern ID of the abridged node with the screen node omitted therefrom in the screen transition structure diagram is acquired (step S361).

Next, in the screen transition abridgement information 81, the screen number of the omitted screen node is deleted from the "list of the screens other than the representative screen" in the data corresponding to the pattern ID acquired in the step S361 (step S362).

Then, in the screen transition diagram display information 61, the screen number of the omitted screen node is deleted from the transition destination screen numbers in the data of the screen in the screen transition pattern corresponding to the abridged node with the screen node omitted therefrom (step S363).

Next, in the screen transition diagram display information 61, the transition destination screen numbers in the data of the saved screen in the screen transition pattern corresponding to the abridged node with the screen node omitted therefrom are revised according to the screen transition pattern 71 (step S364).

Lastly, the screen transition diagram display information 61 changed in the steps S363 and S364 are recorded on the screen transition diagram database 6 (step S365).

Figure 25:
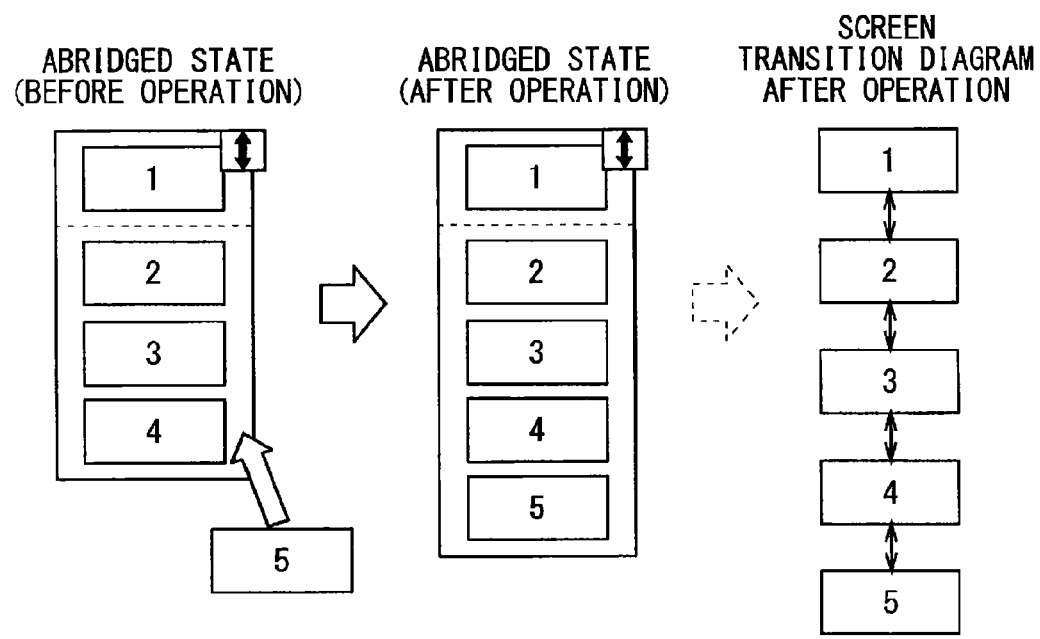
FIG. 25 shows the editing processing for the screen transition structure diagram.

FIGS. 25 and 26 illustrate the state in which the screen transition structure diagram editing unit 44 changes the screen transition diagram according to the change of the screen transition structure diagram.

FIG. 25 shows the operation to add the screen 5 to the abridged node in the screen transition structure diagram with the screen 1, the screen 2, the screen 3, and the screen 4 abridged therein. The screen 5 is added to the abridged node through this operation, so that the screen transition abridgement information 81 is changed. The screen transition is set according to the screen transition pattern 71 such that the screen 5 makes transitions to and from the screen 4 that is the last screen of the screen transition pattern. Thus, the screen transition diagram after the operation is provided.

FIG. 26 shows the operation to omit the screen 3 from the abridged node in the screen transition structure diagram with the screen 1, the screen 2, the screen 3, and the screen 4 abridged therein. The screen 3 is omitted from the abridged node through this operation, so that the screen transition abridgement information 81 is changed. The screen transition is set according to the screen transition pattern 71 to allow the transitions between the screen 2 and the screen 4 that have had the screen-transition relation with the screen 3 and the screen transitions to and from the screen 3 are deleted. Thus, the screen transition diagram after the operation is provided.

<Effects>

In the screen transition diagram creator 100 according to this embodiment, the screen transition structure diagram creating unit 4 adds and deletes the screen node to and from the screen transition structure diagram in response to the external input operation. Therefore, the screen transition can be changed on the screen transition structure diagram, thereby producing the effects of facilitating the changing of the screen transition.

Fourth Embodiment

A fourth embodiment allows the abridgement of the screen node group selected through the input operation by the input and output unit 5.

<Configuration>

FIG. 27 is a diagram showing a main configuration of a screen transition diagram creator 1000 according to the fourth embodiment.

The screen transition diagram creator 1000 according to the fourth embodiment differs from the configuration of the screen transition diagram creator 1 according to the first embodiment in that the screen transition structure diagram creating unit 4 includes a screen transition pattern determining unit 45. The configuration except for the above is similar to that of the screen transition diagram creator 1. The screen transition diagram editing unit 2 and the screen transition pattern applying unit 3 are not shown in FIG. 27.

<Operation>

Figure 28:
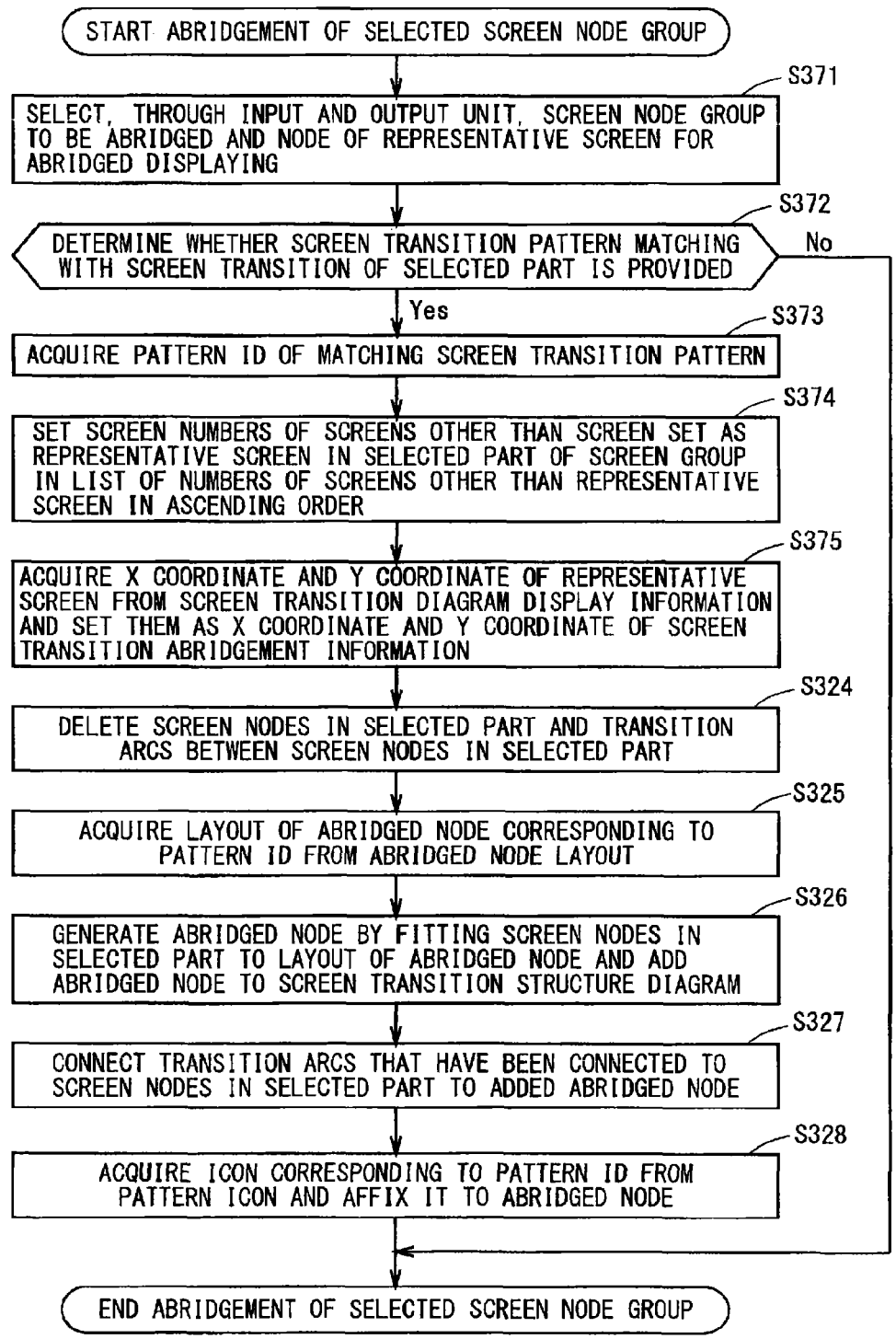
FIG. 28 is a flowchart showing an abridgement processing for a selected screen node group.

FIG. 28 is a flowchart showing an example of the following processing. When the screen node group to be abridged is selected according to the input operation by the input and output unit 5, the screen transition pattern determining unit 45 changes the screen transition abridgement information 81, and then, the screen transition structure diagram generating unit 42 changes the screen transition structure diagram according to the change of the screen transition abridgement information 81. The steps 324 to S328 are similar to those in the flowchart in FIG. 11. Thus, the following description will be given exclusively on steps S371 to S375.

Firstly, the screen node group to be abridged and the node of the representative screen for the abridged displaying are selected in the screen transition diagram according to the input operation performed by the user with the input and output unit 5 (the step S371). If the node of the representative is not selected, the screen transition pattern determining unit 45 provides the screen having the smallest screen number in the selected screen nodes (hereinafter referred to as the "selected part") as the representative screen and sets the screen number as the representative screen number of the screen transition abridgement information 81.

Next, a judgment is made whether the screen transition pattern 71 matching with the screen transition of the selected part is provided (the step S372). The screen transition of the selected part is checked against each item of the screen transition pattern 71, whereby ◯ or x for each item is determined. Note that, the impossible transitions in the screen transition pattern, which are indicated by the blanks in FIG. 4, may be indicated by x.

If it is determined that the screen transition pattern 71 matching with the screen transition of the selected part is not provided, the abridgement processing on the selected screen node group ends.

If the screen transition pattern matching with the screen transition of the selected part is provided (Yes in the step S372), the pattern ID of the screen transition pattern concerned is acquired (the step S373).

After that, the screen numbers of the screens other than the screen set as the representative screen in the screen group of the selected part are set in the list of numbers of the screens other than the representative screen of the screen transition abridgement information 81 in ascending order (the step S374).

Then, the X coordinate and the Y coordinate of the representative screen are acquired form the screen transition diagram display information 61 and are set as the X coordinate and the Y coordinate of the screen transition abridgement information 81 (the step S375). After that, the abridgement processing is performed as in FIG. 11.

The screen transition pattern 71 may include the default screen transition pattern that is applied in a case where the matching screen transition pattern is not provided in the step S372. In this case, the abridged node layout 72 and the pattern icon 73 respectively include the layout and the icon of the abridged node corresponding to the default screen transition pattern. The presence of the matching screen transition pattern is determined on ground of the default screen transition pattern in the step S372. Then, the pattern ID of the default screen transition pattern is acquired in the step S373, so that the abridgement processing is continued.

The screen transition diagram creator 1 according to the first embodiment has performed the abridgement processing on the pattern-applied screen node group to which the predetermined screen transition pattern is applied by the screen transition pattern applying unit 3. Meanwhile, the screen transition diagram creator 1000 according to the fourth embodiment performs the abridgement processing not only on the pattern-applied screen node group but also on the screen node group specified through the external input operation with the screen transition pattern that matches with the screen transition concerned or with the default screen transition pattern, to thereby create the screen transition structure diagram.

Figure 29:
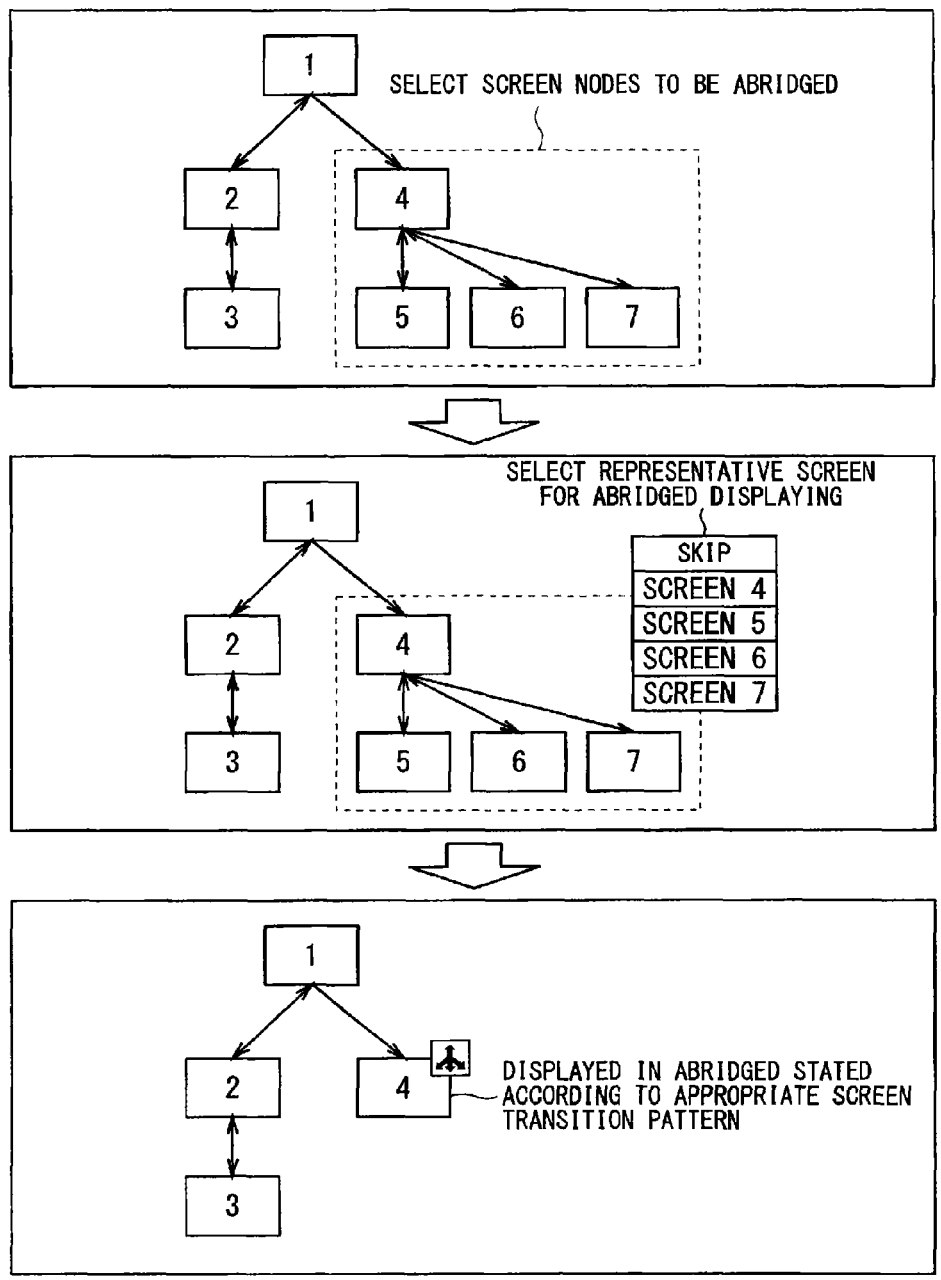
FIG. 29 shows the abridgement processing for the selected screen node group.

FIG. 29 illustrates the state in which the screen transition pattern determining unit 45 changes the screen transition structure diagram according to the input operation by the input and output unit 5. When the user selects, as the screen nodes to be abridged, the screen 4, the screen 5, the screen 6, and the screen 7 in the input and output unit 5, the input and output unit 5 displays the list for specifying the screen number or the skip. If the user specifies the screen 4 in the list, for example, the screen transition pattern of the selected screen group in which the screen 4 is provided as the representative screen is determined, and then, the input and output unit 5 displays the selected screen group in the abridged state according to the abridged node layout and the pattern icon that correspond to the screen transition pattern. If the skip in the list is specified in the above-described example, the abridgement processing is performed assuming that the screen 4 having the smallest screen number in the selected screen group serves as the representative screen.

<Effects>

In the screen transition diagram creator 1000 according to this embodiment, the screen transition structure diagram creating unit 4 performs the abridgement processing on the screen node group specified through the external input operation according to the display layout corresponding to the screen transition pattern that matches with the screen transition concerned. Thus, the screen transition pattern can be automatically judged, which facilitates the creation of the screen transition structure diagram.

The above embodiments of the present invention can be arbitrarily combined, or each embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE NUMERALS

1, 10, 100, 1000 screen transition diagram creator, 2 screen transition diagram editing unit, 3 screen transition pattern applying unit, 4 screen transition structure diagram creating unit, 5 input and output unit, 6 screen transition diagram database, 7 screen transition pattern database, 11 screen display information, 41 screen transition diagram abridging unit, 42 screen transition structure diagram generating unit, 43 screen transition structure diagram expanding unit, 44 screen transition structure diagram editing unit, 45 screen transition pattern determining unit, 61 screen transition diagram display information, 71 screen transition pattern, 72 abridged node layout, 73 pattern icon, 74 abridged node correspondence chart, 81 screen transition abridgement information.

The invention claimed is:
1. A screen transition diagram creator comprising:
a processor configured to execute a program;
a memory that stores the program which, when executed by the processor, results in performance of steps comprising:
providing a screen transition diagram in which transition relations among a plurality of screens are illustrated by a plurality of screen nodes and arrows between said screen nodes,
applying a predetermined screen transition pattern to a target screen node group that comprises at least part of said screen nodes illustrated in said screen transition diagram to provide a pattern-applied screen node group,
creating a screen transition structure diagram by performing an abridgement processing on said pattern-applied screen node group in said screen transition diagram according to a display layout corresponding to said screen transition pattern;
wherein in said abridgement processing, said screen nodes are retained, said arrows between said screen nodes are deleted and an icon that simplistically illustrates a transition pattern of said deleted arrows between said screen nodes displayed in said display layout is added,
a plurality of said display layouts are provided corresponding to said screen transition pattern, and said abridgement processing is performed with said display layout specified through an external input operation.

2. The screen transition diagram creator according to claim 1, wherein at least one representative screen is saved in said abridgement processing.

3. The screen transition diagram creator according to claim 1, wherein
said program which, when executed by said processor, results in performance of a further step comprising,
adding and deleting said screen nodes to and from said screen transition structure diagram in response to an external input operation.

4. The screen transition diagram creator according to claim 1, wherein
said program which, when executed by said processor, results in performance of a further step comprising,
creating said screen transition structure diagram by performing said abridgement processing on said screen node group specified through an external input operation according to said display layout corresponding to said screen transition pattern that matches with said screen transition.

5. A screen transition diagram creator comprising:
a processor configured to execute a program;
a memory that stores the program which, when executed by the processor, results in performance of steps comprising:

providing a screen transition diagram in which transition relations among a plurality of screens are illustrated by a plurality of screen nodes and arrows between said screen nodes,
applying a predetermined screen transition pattern to a target screen node group that comprises at least part of said screen nodes illustrated in said screen transition diagram to provide a pattern-applied screen node group,
creating a screen transition structure diagram by performing an abridgement processing on said pattern-applied screen node group in said screen transition diagram according to a display layout corresponding to said screen transition pattern;
wherein in said abridgement processing, said screen nodes are retained, said arrows between said screen nodes are deleted and an icon that simplistically illustrates a transition pattern of said deleted arrows between said screen nodes displayed in said display layout is added,
a plurality of said display layouts are provided corresponding to said screen transition pattern, and
said abridgement processing is performed with said display layout selected according to a predetermined condition.

* * * * *